US008989893B2

(12) United States Patent
Jones et al.

(10) Patent No.: US 8,989,893 B2
(45) Date of Patent: Mar. 24, 2015

(54) METHOD AND APPARATUS FOR DISPENSING FROZEN CONFECTIONERY

(75) Inventors: Allan S. Jones, Awendaw, SC (US); Jack F. Rutledge, Chattanooga, TN (US); James S. Wolf, Silver Lake, OH (US); Jeffrey L. Redington, Nooksack, WA (US); Scott E. Osborn, Knoxville, TN (US)

(73) Assignee: Robofusion, Inc., Charleston, SC (US)

( * ) Notice: Subject to any disclaimer, the term of this patent is extended or adjusted under 35 U.S.C. 154(b) by 934 days.

(21) Appl. No.: 12/945,395

(22) Filed: Nov. 12, 2010

(65) Prior Publication Data

US 2011/0108569 A1    May 12, 2011

Related U.S. Application Data

(63) Continuation-in-part of application No. 11/669,768, filed on Jan. 31, 2007, now Pat. No. 7,896,038.

(60) Provisional application No. 60/858,417, filed on Nov. 9, 2006, provisional application No. 60/763,512, filed on Jan. 31, 2006.

(51) Int. Cl.
*A23G 9/22* (2006.01)
*A23G 9/24* (2006.01)

(52) U.S. Cl.
CPC ................. *A23G 9/22* (2013.01); *A23G 9/228* (2013.01); *A23G 9/245* (2013.01)
USPC .............................. 700/234; 700/233; 221/24

(58) Field of Classification Search
USPC .............................. 700/233, 234; 221/24, 155
See application file for complete search history.

(56) References Cited

U.S. PATENT DOCUMENTS

| 2,057,880 | A |   | 10/1936 | Collison et al. |
|-----------|---|---|---------|-----------------|
| 2,728,306 | A |   | 3/1949  | Tarr            |
| 2,888,167 | A |   | 5/1959  | Erickson        |
| 3,876,110 | A |   | 4/1975  | Logie           |
| 4,009,740 | A | * | 3/1977  | Michielli ...................... 141/172 |
| 4,174,742 | A |   | 11/1979 | Murphey         |
| 4,324,059 | A |   | 4/1982  | Baum            |
| 4,645,093 | A |   | 2/1987  | Jones           |
| 4,860,876 | A |   | 8/1989  | Moore et al.    |
| 4,889,210 | A |   | 12/1989 | Alcaraz et al.  |
| 4,942,910 | A |   | 7/1990  | Hamamura        |
| 5,027,698 | A |   | 7/1991  | Chirnomas       |
| 5,042,686 | A | * | 8/1991  | Stucki ............................. 221/13 |
| 5,526,615 | A | * | 6/1996  | Kaizu et al. .................... 52/79.6 |

(Continued)

FOREIGN PATENT DOCUMENTS

EP    1450318    8/2004
WO    9115833    4/1991

*Primary Examiner* — Timothy Waggoner
(74) *Attorney, Agent, or Firm* — Sand & Sebolt

(57) ABSTRACT

A method and apparatus for assembling and vending a food or drink product using a machine having a viewing window into the interior thereof. The user selects through a user interface one of a plurality of characters, then selects through the interface the ingredients to include in the product. The ingredients are dispensed into a receptacle that is moved between dispensing locations within the machine by a robotic arm. An animated sequence, soundtrack and lighting pattern is associated with each character. As the robotic arm assembles the product, the animated sequence, soundtrack and lighting for the selected character are run and shown on a display. The user is able to watch the movements of the robotic arm and the animated sequence simultaneously.

11 Claims, 21 Drawing Sheets

(56) References Cited

U.S. PATENT DOCUMENTS

| | | | |
|---|---|---|---|
| 5,727,609 A | 3/1998 | Knight et al. | |
| 5,785,204 A * | 7/1998 | Thompson et al. | 221/24 |
| 5,893,485 A | 4/1999 | McGill | |
| 5,921,170 A * | 7/1999 | Khatchadourian et al. | 99/349 |
| 5,959,869 A | 9/1999 | Miller et al. | |
| 5,997,236 A * | 12/1999 | Picioccio et al. | 221/197 |
| 5,997,924 A * | 12/1999 | Olander et al. | 221/150 R |
| 6,328,180 B1 | 12/2001 | Sorensen et al. | |
| 6,363,838 B1 * | 4/2002 | Tomatis | 99/353 |
| 6,390,334 B1 | 5/2002 | Kim et al. | |
| 6,513,677 B1 | 2/2003 | Sorensen et al. | |
| 6,560,973 B2 | 5/2003 | Jones et al. | |
| 6,899,337 B2 | 5/2005 | Fisher et al. | |
| 6,929,149 B2 | 8/2005 | Selfridge et al. | |
| 7,052,728 B2 | 5/2006 | Kateman et al. | |
| 7,128,237 B2 | 10/2006 | Holdway et al. | |
| 7,128,239 B2 | 10/2006 | Skavnak | |
| 7,640,755 B1 * | 1/2010 | Kateman | 62/60 |
| 7,798,182 B2 * | 9/2010 | Herrick et al. | 141/9 |
| 7,818,089 B2 * | 10/2010 | Hanna et al. | 700/233 |
| 8,032,251 B2 * | 10/2011 | Monn | 700/233 |
| 8,276,505 B2 * | 10/2012 | Buehler | 99/326 |
| 2004/0251270 A1 | 12/2004 | Davis et al. | |
| 2005/0211768 A1 | 9/2005 | Stillman | |
| 2009/0310945 A1 | 12/2009 | Stallings | |
| 2010/0198400 A1 | 8/2010 | Pascal et al. | |

* cited by examiner

METHOD AND APPARATUS FOR DISPENSING FROZEN CONFECTIONERY

CROSS-REFERENCE TO RELATED APPLICATIONS

This is a Continuation-in-Part of U.S. patent application Ser. No. 11/669,768, filed Jan. 31, 2007 which claimed the benefit of U.S. Provisional Patent Application Nos. 60/763,512, filed Jan. 31, 2006 and 60/858,417 filed Nov. 9, 2006, the entire specifications of which are incorporated herein by reference.

BACKGROUND OF THE INVENTION

1. Technical Field

The present invention relates in general to automated dispensing/vending machines. More particularly the present invention relates to a vending machine for dispensing a frozen confectionary (such as ice cream) wherein the customer customizes his purchase by selecting from a variety of available solid and/or liquid toppings or additives, and where the purchase occasion may be enhanced by visual and/or auditory stimuli during the vending process.

2. Background of the Invention

Automated machines for dispensing ice cream and other frozen confectioneries are known in the art. For example, Chirnomas (U.S. Pat. No. 5,027,698) discloses an ice cream vending machine wherein the machine dispenses pre-filled containers of ice cream. Davis et. al. (United States Patent Application 2004/0251270) describes an ice cream dispensing machine for dispensing soft-serve ice cream. Kateman et. al. (U.S. Pat. No. 7,052,728) describes a machine for vending single servings of different flavors, wherein selected flavorants are mixed into a base liquid prior to freezing. These and other automated vending devices do not provide the customer an enhanced purchase occasion in that the process of preparing and conveying the selected product is generally invisible to the customer. Alcaraz et. al. (U.S. Pat. No. 4,889,210) describes a robotic vending machine. However, in the Alcaraz patent the dispensing process is limited to transferring pre-packaged items to the customer or to placing single items (such as a beverage) into a container.

SUMMARY OF THE INVENTION

Accordingly, it is an object of the invention to provide a frozen confectionary vending machine wherein the customer can enjoy a high degree of product customization.

A method and apparatus for assembling and vending a food or drink product using a machine having a viewing window into the interior thereof is disclosed. The user selects through a user interface one of a plurality of characters, then selects through the interface the ingredients to include in the product. The ingredients are dispensed into a receptacle that is moved between dispensing locations within the machine by a robotic arm. An animated sequence, soundtrack and lighting pattern is associated with each character. As the robotic arm assembles the product, the animated sequence, soundtrack and lighting for the selected character are run and shown on a display. The user is able to watch the movements of the robotic arm and the animated sequence simultaneously.

It is an object of the invention that the product customization process be visually and/or aurally stimulating for the customer.

It is a further object of the invention that the product customization process includes the optional addition of one or more liquid and/or solid toppings to one or more dispensed base products, such as ice cream flavors.

Still another object of the invention is to provide a frozen confectionary vending machine having a plurality of dispensing stations for dispensing desired choices of frozen confectionary and toppings/additives.

The above as well as other objects are achieved by a frozen confectionary vending machine uniquely configured to assemble and deliver a frozen confectionary product to a user of the machine. The machine includes a housing having an interior and a transparent viewing window for viewing at least a portion of the interior of the machine. A frozen confectionary dispensing station contained within the housing dispenses a measured amount of a frozen confectionary, such as ice cream, into a product receptacle. One or more topping dispensing stations are contained within the housing with each topping dispensing station configured to dispense a measured amount of a topping into the product receptacle. A user interface enables the user to select one or more parameters of the frozen confectionary product. A product delivery port is employed for delivery of the product receptacle containing the assembled product to the user. A robotic transfer mechanism, such as a robotic arm with three dimensional movement, moves the product receptacle between the dispensing stations and to the product delivery port after assembly of the frozen confectionary product. Operation of the machine is controlled by an electronic processor based on selections entered through the user interface.

Each topping dispensing station preferably includes a topping container for containing a topping, and a topping delivery conductor for conducting the measured amount of topping into the product receptacle. Preferably, each topping container and delivery conductor are transparent to enhance the user's viewing experience. Speakers and flashing lights may also be employed to provide additional visual and aural stimuli to the user.

The present invention also provides a method for vending a frozen confectionary product. The method includes the steps of providing a vending machine having a housing with a transparent viewing window as described above. A measured amount of a frozen confectionary is dispensed into a product receptacle within the housing. A measured amount of one or more toppings is also dispensed into the product receptacle. One or more parameters of the frozen confectionary product are selected through a user interface. During assembly, the product receptacle is moved between the dispensing stations and, following assembly, is moved to a product delivery port where the assembled product is accessible by the user.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings where:

DETAILED DESCRIPTION OF THE PREFERRED EMBODIMENTS

An attribute of the frozen confectionary vending apparatus and method described herein is that it provides a stimulating and rewarding experience to a customer in addition to a customized product. While not limited to any particular class of customers, it is anticipated that customers less than sixteen years of age may be particularly appreciative of the features of this invention.

Figure 1:
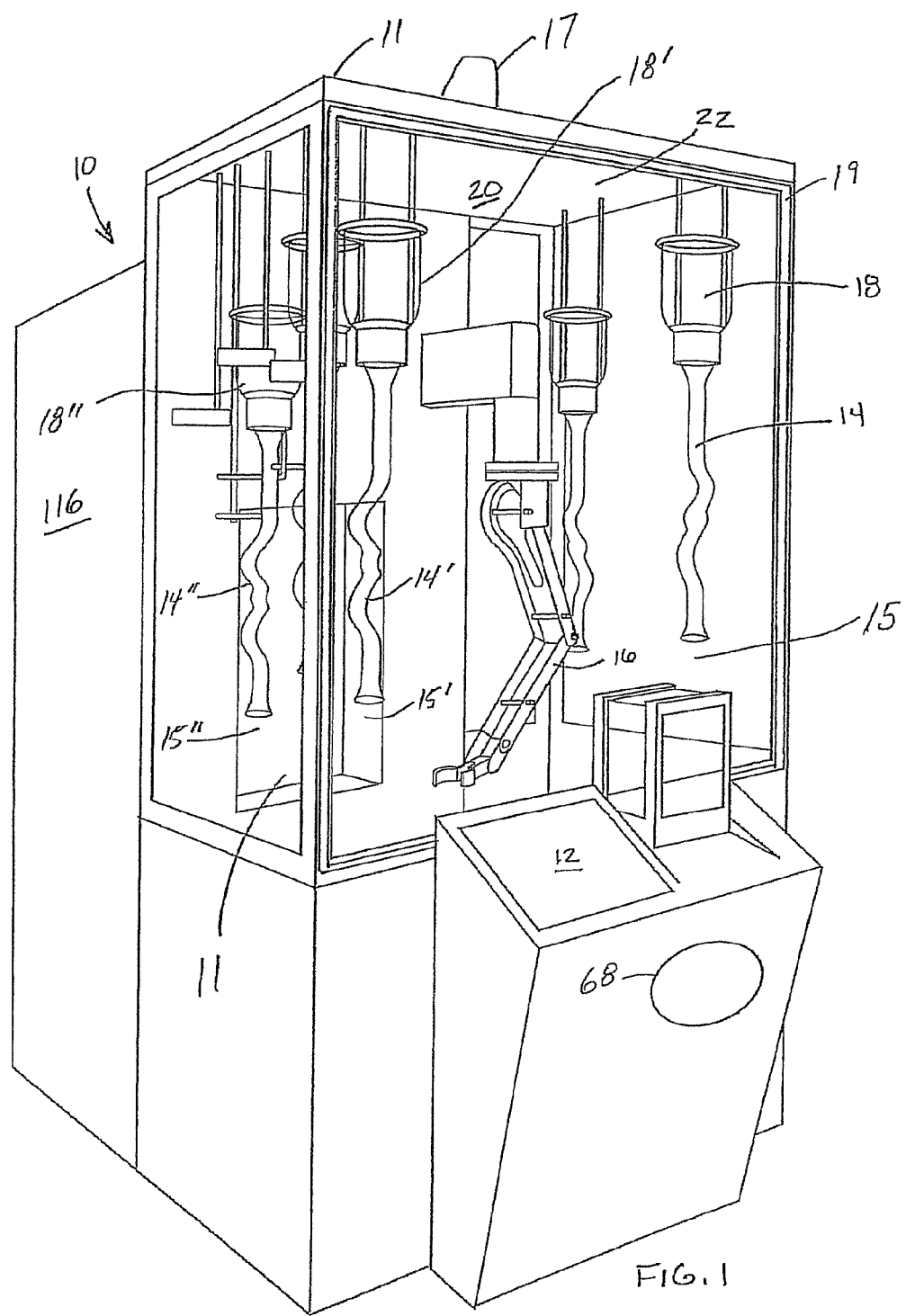
FIG. 1 is a perspective side view of a first embodiment of a frozen confectionary vending machine according to the present invention.

Referring to FIG. 1, a frozen confectionary vending machine 10 in accordance with the invention includes a housing 11 with an interior 20 containing a frozen confectionary dispensing station 13 for dispensing a measured amount of one or more flavors of a frozen confectionary (such as ice cream, sherbet, yogurt, custard and flavored or non-flavored ice), a topping dispensing station 15 for dispensing a measured amount of topping (such as chocolate syrup or candies) from a toppings container 18 via a toppings delivery conductor 14, and a robotic transfer mechanism, such as a robotic arm 16, for moving a product receptacle, such as a cup or other form of container, for the frozen confectionary product to the various dispensing stations of the machine 10 according to specifications/selections enter by a customer or other user via a user interface 12.

Figure 3:
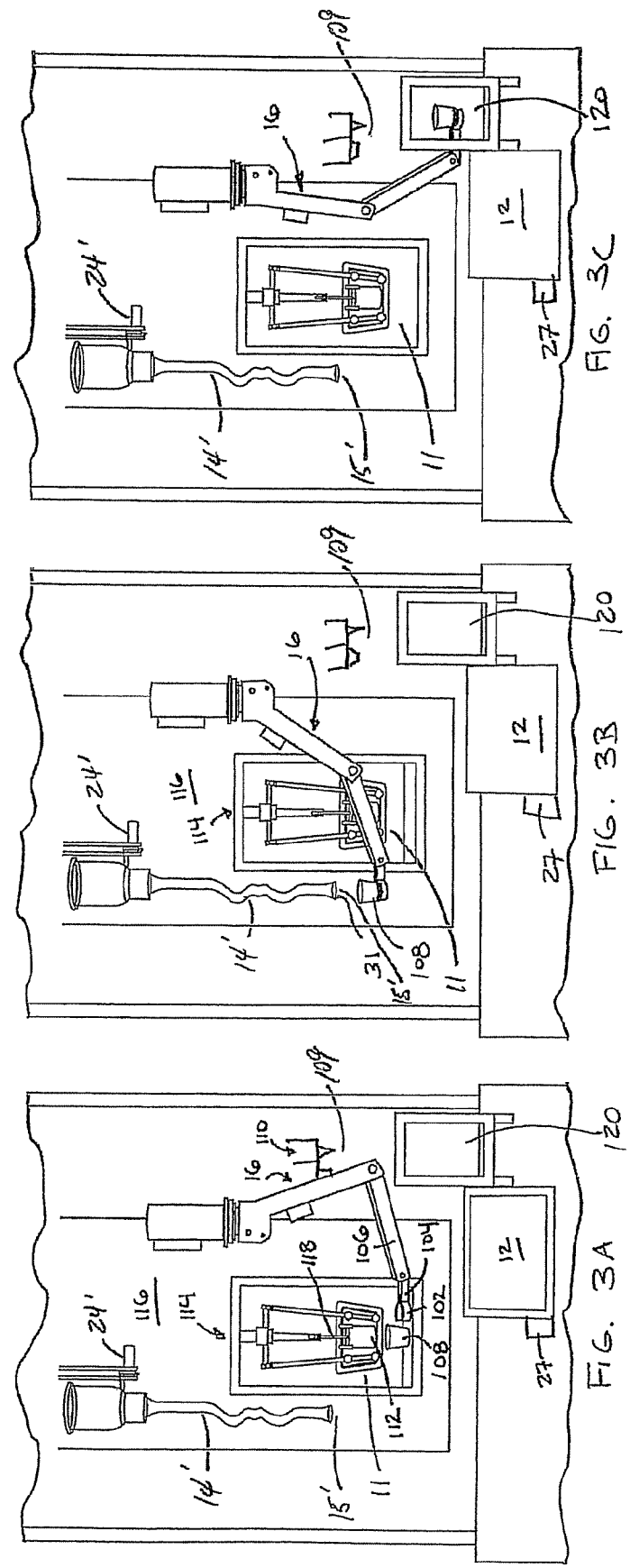
FIGS. 3A-C are sectional front views of the frozen confectionary vending machine illustrating sequential operation of the machine to assemble and deliver a frozen confectionary product according to the invention.

Housing 11 includes one or more transparent viewing windows 22 to enable the user to view the confectionary product as it is being made. Toppings container 18 as well as topping delivery conductor 14 are also preferably transparent or translucent, which advantageously enables the customer to view the topping contained therein. In a preferred embodiment as shown in FIG. 1, vending machine 10 includes a plurality of topping dispensing stations 15', 15" with transparent toppings containers 18', 18" and transparent topping deliver conductors 14', 14" to enable the user to select and view the delivery of one or more toppings from a plurality of available toppings. Vending machine 10 may incorporate additional features, including but not limited to lights 17, 19 that are controllable by an electronic processor 27 (FIGS. 3A-C) to flash, strobe, race, etc., bells, whistles, loudspeakers 68, internet access, seats, and computer games, all of which would be controllable by processor 27.

Vending machine 10 is preferably stationary during use. Mobility of the machine 10 may be enhanced by attaching casters, rollers or wheels to the bottom of the machine 10. If desired, the vending machine 10 may be self-propelled or part of a self-propelled system (i.e., such as mounted on a vehicle) to further enhance mobility.

As described above, the interior 20 of the vending machine 10 is visually accessible to the user. Such visual access may be through transparent and/or translucent glass or plastic panels 22 or panel portions, through metal or wire grids or bars, or by any combination, including by video camera, sufficiently transparent or translucent panels, and/or by any other means that provides the customer with visual access to at least desired portions of the product assembly process.

Figure 4:
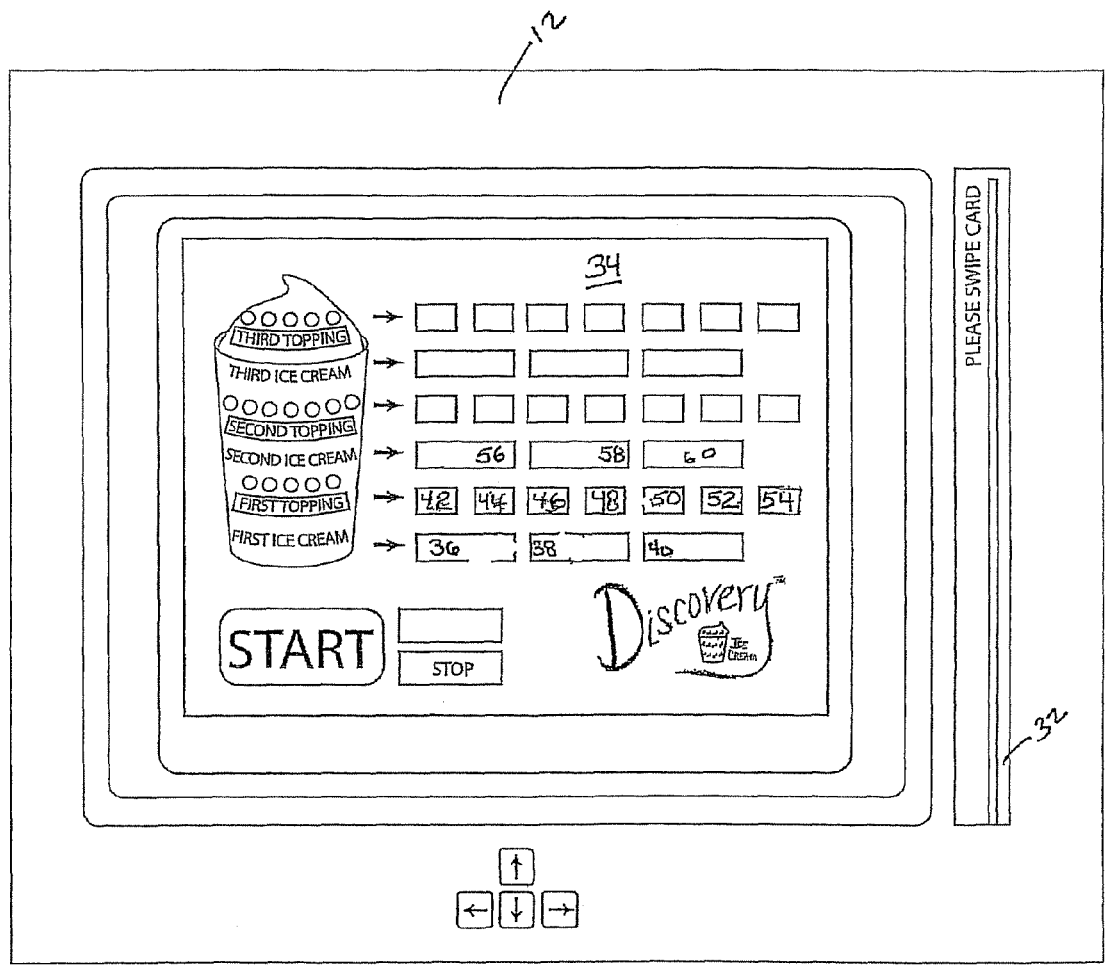
FIG. 4 is a plan view of a user interface for the vending machine of FIG. 1.

Referring to FIGS. 1 and 4, the user interface 12 is preferably positioned such that it can be comfortably and effectively operated by customers or other users who are between two feet and seven feet tall. Access to the user interface 12 may be enhanced by the presence and/or operation of stationary or retractable stairs, elevators, platforms, or any combination of these features. Such features may also be utilized by a user to increase visibility of the interior portion 20 of the vending machine 10 in order to enhance the vending occasion and/or experience.

Figure 2:
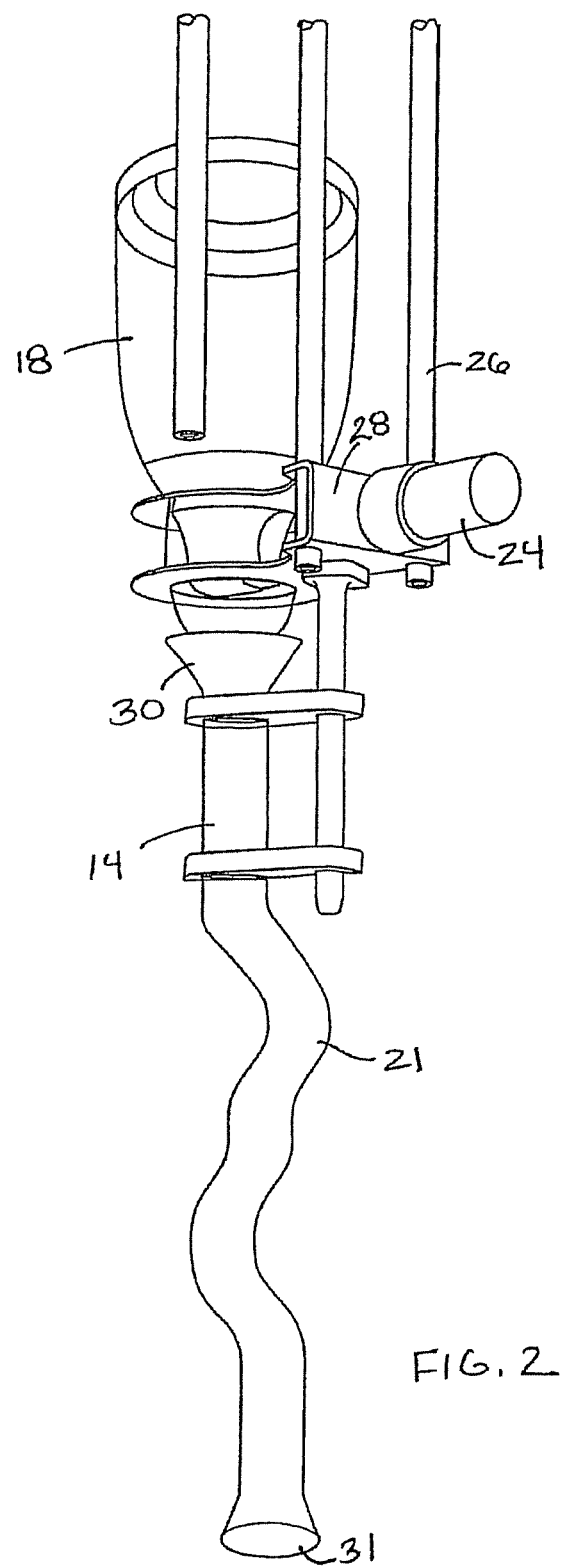
FIG. 2 is a perspective side view of a transparent topping dispensing station for a vending machine according to the invention.
Figure 5:
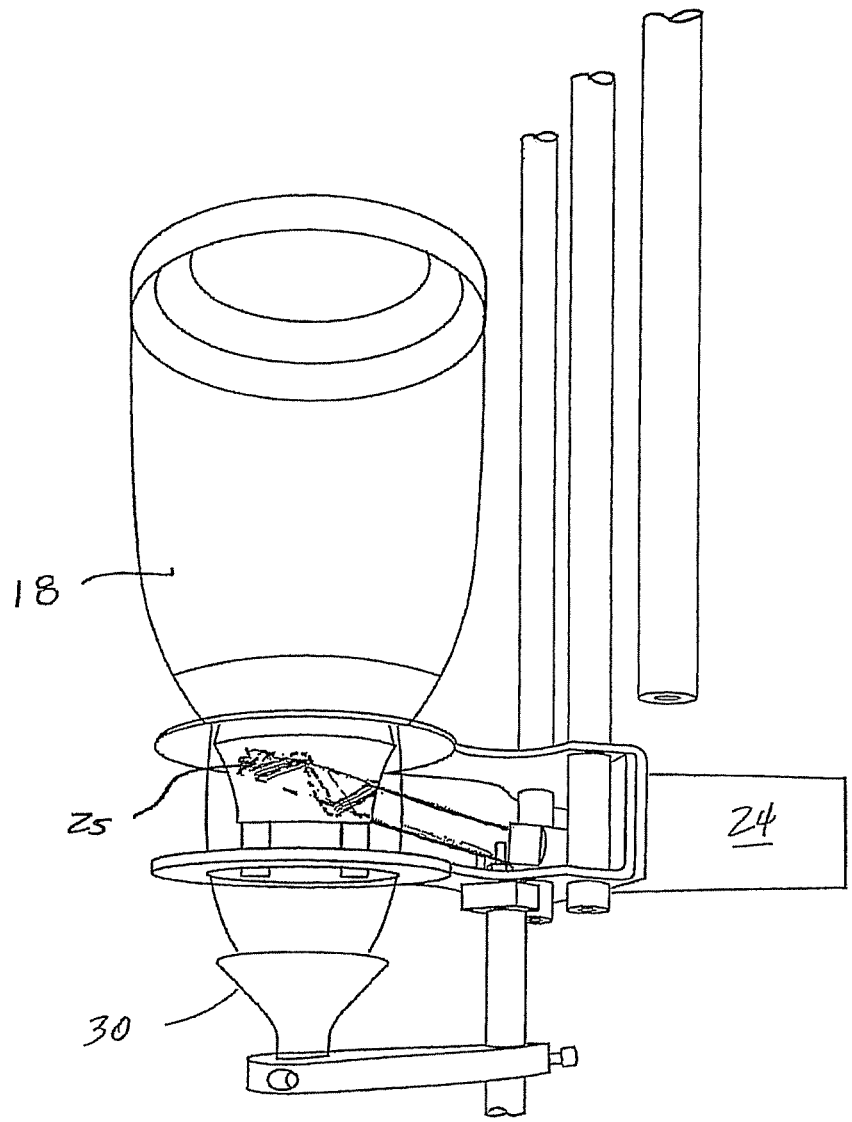
FIG. 5 is a sectional side view of a topping container and related structure for dispensing a measured amount of topping according to the invention.

Referring to FIG. 2, topping delivery conductor 14 is preferably in the form of a transparent tube. However, it will be understood that any configuration of conductor 14 suitable for delivering a measured amount of topping from container 18 to a product receptacle may be used instead. Preferably, conductor 14 is constructed in such a manner that at least a portion of the transference of one or more toppings can be viewed by the customer during the delivery process by being translucent and/or transparent and/or otherwise visible. A single conductor 14 may be utilized to transfer a single or multiple toppings. Alternatively, a plurality of conductors 14, 14', 14" can be used to transfer multiple toppings from multiple containers 18 into the product receptacle. The conductor 14 illustrated has a funnel-shaped inlet 30 (see also FIG. 5) to help ensure effective delivery/transfer of the topping into the conductor 14 and an outlet 31 (which is better seen with respect to FIGS. 3 and 4) through which the topping is delivered into the product receptacle.

With continued reference to FIG. 2, retarders 21 are preferably incorporated into conductor 14 to help retard/slow the flow of topping into the product receptacle 108 (as shown in FIG. 3b) to prevent splashing or spilling of the topping. Retarder 21 is preferably in the form of bends, curves, baffles or other such structure which lengthens the amount of time it takes for the topping to travel the length of the conductor 14. Retarders 21 may or may not be visually accessible in all embodiments, but are in a preferred embodiment. Retarders 21 of the type shown in FIG. 2 are also believed to enhance the user's viewing experience.

In addition to providing visual stimulus, the transference of any topping from a container 18 may be accompanied by sounds, including sounds naturally made by the topping passing through the conductor 14, or by artificially created sounds such as musical tunes, bells, whistles, alarms, etc. played through a speaker 68 (FIG. 6) that is operated by computer 27. Artificially created sounds may also arise from the interaction of one or more toppings with a secondary device such as a whirring, spinning wheel.

The toppings container 18 is preferably visually accessible (i.e., transparent) as illustrated. This is helpful in that it provides an attractive visual stimulus to customers as well as provides a quick way for a service technician to check the amount of topping remaining within the container 18. In order to dispense toppings from the container 18 to the conductor 14, a preferred embodiment of machine 10 employs a servo motor 24 or other force generating unit for dispensing a measured amount of toppings from the container 18 to the conductor 14 upon receipt of instructions from an electronic processor such as a computer 27 (FIGS. 3A-C) in electronic communication with the user interface 12 and motor 24. An auger 25 (FIG. 5) or other suitable structure may be driven by servo motor 24 to precisely dispense the measured amount of topping from container 18.

With reference still to FIG. 2, supports 26 are employed to support a platform 28 to which servo motor 24 is secured. In a preferred embodiment, conductor 14 is supported by (or alternatively may be used to support) platform 28, such as in the manner illustrated in FIG. 2, and provides an aesthetically pleasing appearance without interfering with the operation of servo motor 24 or auger 25 during dispensing of toppings into a product receptacle 108, as shown in FIG. 3b. Scooping mechanisms, valve based systems, or other dispensing arrangements may be employed in other embodiments.

Referring to FIGS. 3A-3C, robotic arm 16 may be constructed of any materials suitable for transferring the product receptacle to the various dispensing stations 15, 15', 15" and product delivery port 120. For purposes of illustration, only one topping dispensing station 15' is shown in FIGS. 3A-C. Movement of the robotic arm 16 is preferably controlled by computer 27 that is programmed to move the aim 16 according to selections/instructions entered by the customer through the user interface 12. Alternatively, robotic arm 16 may be at least partially controlled or controllable by the customer through the user interface 12. More than one robotic aim 16 may be utilized as needed or desired.

The robotic arm 16 preferably has at least three axes of movement, which is largely enabled by the use of pivoting links 104, 106. More specifically, robotic arm 16 is capable of movement in a horizontal left-to-right dimension (x-axis), a horizontal front-to-back dimension (y-axis), and a vertical up-and-down dimension (z-axis). Hand 102, which is used to grasp and hold product receptacle 108, is carried by robotic arm 16 as it moves in three dimensions. Other robotic transfer mechanisms may be utilized in conjunction with and/or in place of the robotic arm 16.

With reference to FIGS. 3A-C in sequence, FIG. 3A shows that during an exemplary product assembly and delivery process, link 104 is maintained in a constant horizontal attitude as robotic arm 16 moves in at least three dimensions so that the product receptacle 108, in this case an inedible cup 108, can be transported without spilling any of its contents. Receptacle 108 can be moved elevationally as well as horizontally over a significant left to right range, as well as forward and backward.

In FIG. 3A, an empty product receptacle or cup 108 has been removed from product receptacle dispenser 110, which preferably includes at least two types of products receptacles (such as an inedible cup and an edible cone) that are selectable by the user through the user interface 12. The receptacle 108 is moved by the robotic arm 16 between the various dispensing stations 11, 15, 15', 15" including product receptacle dispensing station 109. Frozen confectionary product dispensing station 11 includes an outlet 112 for a frozen confectionary product dispenser shown generally at 114. Dispenser 114 is preferably configured to dispense two or more types and/or flavors of frozen confectionary product. Preferably, the dispenser 114 can dispense at least three if not four or more flavors. The frozen confectionary products are preferably stored in a frozen or chilled condition in a cooler shown generally at 116. The particular types and/or flavors to be dispensed are preferably controlled by computer 27 through selections entered at user interface 12. Once receptacle 108 is at least partially filled with frozen confectionary, the product receptacle 108 is moved to topping dispensing station 15' and positioned below the outlet 31 conductor 14'. A signal is output by computer 27 to instruct motor 24' to dispense a measured amount of topping into the product receptacle 108 on top of at least a first layer of frozen confectionary. Alternatively, a topping may be dispensed into receptacle 108 before any frozen confectionary is dispensed. In addition, multiple toppings and/or confectionary products may be layered into receptacle 108 (i.e., a layer of coolie portions followed by a layer of chocolate syrup followed by a layer of ice cream or other combination) as dictated by customer selections entered through the user interface 12.

With further reference to FIGS. 3A-C, a mixing assembly 118 may be employed (such as with air or mechanical mixing/stirring devices) to assist in mixing the frozen confectionary and topping(s) in receptacle 108. Following assembly of the frozen confectionary product, receptacle 108 is moved to product delivery port 120 where it is received by the customer.

A preferred embodiment of the user interface 12, shown in FIG. 4, includes a touch screen panel 34. Alternative forms of a user interface, such as keyboard, keypads, knobs, wheels, push buttons, switches, joysticks, etc., or combinations thereof, may be employed as well. The user interface 12 is preferably interactive with the customer, providing visual and/or auditory feedback regarding the customer's selections. In addition, the user interface 12 may provide additional stimulation to the customer in the form of questions that may be answered and opportunities to change selections. It is anticipated that the user interface 12 may also provide customers an opportunity to test their knowledge and/or skill in return for a greater product portion and/or additional toppings.

The user interface 12 is also preferably configured to provide a means for the customer to tender payment for the vended product, such as with a credit/debit card reader 32. Alternatively, a customer payment device is separate from the user interface 12. Other payment systems include, but are not limited to, bill acceptors, coin acceptors, token acceptors, credit card scanners, ID and password input devices, retinal scanners, fingerprint scanners, devices that communicate with the customer's cellular phone, and any other suitable form of payment technology. The user interface 12 is in electronic communication with computer 27, which provides signals to operate robotic arm 16, servo motor 24, flashing lights 17, 19, speaker 68, and possibly other activatable components of the vending machine 10.

As can be seen from the user interface 12 of FIG. 4, a touch screen panel 34 is provided in which a first frozen confectionary selection can be made from among a first group of frozen confectionary selections 36, 38, 40, each of which may represent a different type and/or flavor (or combinations of types and/or flavors) of frozen confectionary such as ice cream. The user can also select one or more toppings from a first group of topping choices 42, 44, 46, 48, 50, 52, 54, 56, each of which may represent a single topping type and/or flavor (such as chocolate syrup, caramel syrup, various nuts, various candies, granola, etc.) or a combination of such toppings. A second group of topping selections 56, 58, 60 may also be provided to enable the user to specify multiple layers of frozen confectionaries and toppings as desired. Mixing of the dispensed ingredients may be accomplished with mixing assembly 118, which is in electronic communication with computer 27.

Figure 6:
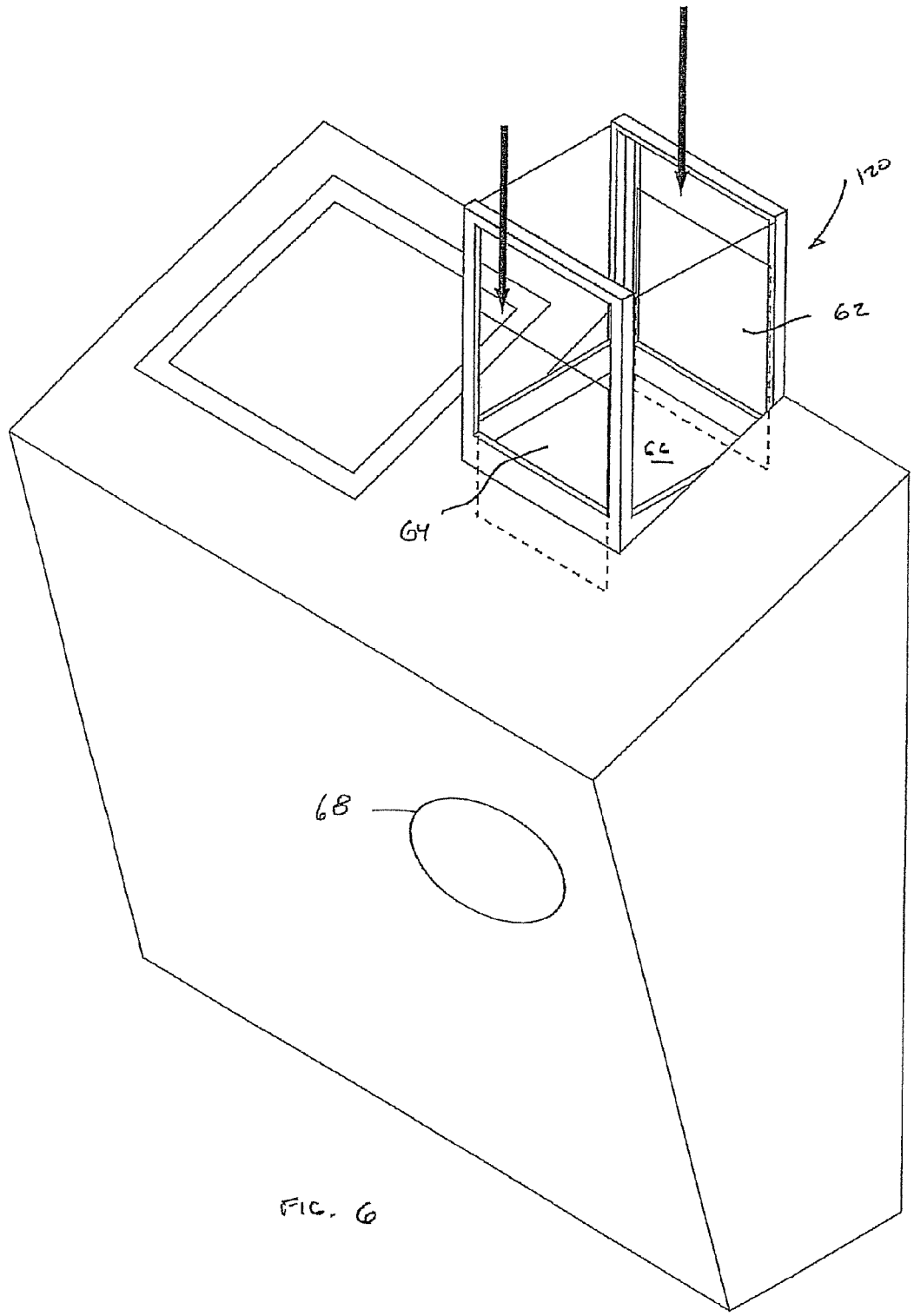
FIG. 6 is a perspective side view of a product delivery port for a vending machine according to the invention.

Referring to FIG. 6, a preferred embodiment of a product delivery port 120 includes an internal door 62 operable by computer 27 that separates the interior 20 of the vending machine 10 from the exterior. Internal door 62 functions to ensure a sanitary barrier between the interior 20 and the exterior of the vending machine 10 and prevents customers from accessing and potentially contaminating the interior 20 of the vending machine 10. An external door 64 is preferably provided to enable the customer to access the assembled product. The two doors 62, 64 define an intermediate surface 66 to which the assembled product is delivered by robotic arm 16. Doors 62, 64 are preferably interlocked in a way that prevents both doors from being open at any point in time, which prevents unauthorized physical access to the interior 20 of the vending machine 10.

In one preferred embodiment, the vending machine 10 of the present invention is capable of providing at least three different ice cream flavors and at least six different toppings. The order of the addition of the different flavors and the different toppings may be controllable by the customer. Examples of ice cream flavors that may be supplied include but are not limited to vanilla, chocolate, and various fruit flavors. Each ice cream flavor may be supplied as a pre-formulated product or as a base wherein the flavorants are added at the time of selection by the customer. It will be understood that the method in which the ice cream is produced, formulated, and dispensed may be implemented in various ways. For example, ice cream may either be mixed and frozen fresh by the machine 10 or made offsite and delivered to the machine 10. Any suitable automated method for dispensing the ice cream or other frozen confectionary may be employed.

Examples of toppings that may be dispensed include but are not limited to hard candies such as M&M's®; soft candies such as Gummi Bears®, fruits such as raisins, dried pineapple or cherries; nuts, sauces, syrups, cookie crumbs, cookie dough, granola, or other liquid and/or solid based topping. In addition to their use as toppings, the toppings may be admixed as an admixture into any selected ice cream flavor to create an ice cream admixture. For example, blending of cookie crumbs or chocolate syrup into vanilla ice cream by the vending machine could provide an ice cream admixture.

In one hypothetical scenario, for each serving of ice cream there may be up to three different choices of ice cream selected and three different toppings, with each topping chosen from six available toppings. In this scenario, there would be over 5,000 distinct possible combinations selectable by the user.

In addition to the ability to provide a highly customized product, another element of a preferred embodiment is the provision of an auditorily and/or visually stimulating experience for the customer, such as with dynamic or interactive control as described herein. Accordingly, an element of the present invention is that at least a significant portion of the preparation of the customized product is visible to the customer. Visual access to the preparation of the customized product can be achieved by the use of transparent conveyances, transparent storage containers, and visual contact with interior portions of the vending machine 10 through such means as, for example, transparent panels, wire grids, television monitors, or the like. Furthermore, it is anticipated that the visible interior portions of the vending machine 10 provide visual stimulation through motion of at least the robotic arm 16, movement of the toppings, and movement of the product receptacle 108. In a preferred embodiment, the vending machine 10 of the present invention may provide additional stimulation by allowing enhanced interaction with the customer through the user interface 12, wherein in addition to receiving commands from the customer, the user interface 12 may allow at least partial interactive control of the product assembly/dispensing process. In yet another preferred embodiment, the user interface 12 may provide the customer with additional stimulation and interaction by providing opportunities for the customer to exhibit mental or physical dexterity prior to or concurrent with the assembly of the product, with rewards for success in exhibiting such mental or physical dexterity.

While the foregoing description has been directed toward the dispensing of frozen confectionary based products, it will be understood that the scope of the present invention encompasses the delivery of other customizable products to a customer in a visually and/or aurally stimulating manner, perhaps in a dynamically interactive manner. For example, a vending machine may be configured to assemble and dispense hot beverages (such as coffee, tea and cocoa). In the example of a coffee vending machine, a specific coffee type (i.e., dark roast, espresso, decaffeinated, etc.) is combined with additives such as whipped cream topping, chocolate flakes, sugar, creamers, spices, flavors of various kinds, etc. to provide a customized product. Customer performance related benefits may be available as well, such as the provision of more of a topping for a certain performance level or other dynamically interactive feature. As a further example of customizable products suitable the invention, pre-manufactured crayons could be assembled in accordance with the desires of a customer. For this product, the customer is able to select a specific set of colors that will comprise the assembled crayon package (i.e., 2 red and 3 blue in a package of 5 crayons, or which 8 of 15 colors are provided, etc.).

Exemplary embodiments of the invention will now be illustrated in the following examples, which are not to be construed as encompassing all possible embodiments.

EXAMPLE 1

Ice Cream/Toppings Treat

A vending machine 10 of the present invention possesses three separate ice cream flavors and six different toppings.

Each topping is contained in a separate transparent toppings container 18 that is placed directly over a transparent, multi-bend plastic tube or conductor 14. Adjacent the bottom of each toppings container 18 is an auger 25, paddle wheel, or other measuring/dispensing mechanism. The vending machine 10 is activated by a customer by the process of swiping a credit card at the user interface 12. The user interface 12 then asks the customer to select his or her first ice cream flavor using a touch screen. After the first flavor is selected, the user interface 12 asks the customer to select the first topping using the same touch screen. The user interface 12 then asks if the customer would like to select a second ice cream, followed by a second topping, etc. until the customer indicates no additional ice cream flavors or toppings are desired, or a predetermined number of toppings and ice creams have been selected.

The robotic arm 16 then acquires a product receptacle 108 (which may also be selectable by the user) from a product receptacle dispenser 110 and places the product receptacle 108 under a first ice cream dispenser 114. Next the robotic arm 16 moves the product receptacle 108 to a position below the outlet 31 of the conductor 14 that connects to a selected toppings container 18. The auger 25 is then activated with servo motor 24 to deliver a measured amount of the first selected topping to the top of the conductor 14, whereupon the selected topping is transported by gravity atop the ice cream in the product receptacle 108. After delivery of the first topping is complete, the robotic arm 16 moves the product receptacle 108 to the next selected ice cream dispenser 114, followed by positioning the receptacle 108 below the outlet 31 of the second selected toppings visual conveyance 14, etc., until the product as specified by the customer is fully assembled. The robotic arm 16 then places the filled product receptacle 108 at a product delivery port 120 where it is transported through the first door mechanism 62 to be retrieved by the customer.

EXAMPLE 2

Ice Cream/Toppings Treat

A vending machine 10 of the present invention possesses one ice cream flavor and five different toppings. Each topping is contained in a separate transparent toppings container that is placed directly over a transparent, coiled glass tube or conductor 14. The bottom of each toppings container possesses an auger or paddle wheel. The vending machine 10 is activated by a customer inserting a token. The user interface touch screen panel 34 then asks the customer to select the topping that will be on top, in the middle and on the lowest level. In this example, the ice cream treat that is made will possess a total of six layers; with ice cream in layers 1, 3, and 5 (from the bottom to top) and toppings in layers 2, 4, and 6. The robotic arm 16 then acquires a product receptacle 108 from a product receptacle dispensing station 109 and places the product receptacle 108 under a first ice cream dispenser 114. Next, the robotic arm 16 then moves the product receptacle to a position below the outlet 31 of the transparent conductor 14 that connects to the selected toppings container. The auger 25 is then activated to deliver a measured amount of the first selected topping to the top of the transparent conductor 14, whereupon the selected topping is transported by gravity to the top of the ice cream in the product receptacle 108. After delivery of the first topping is complete, the robotic arm 16 moves the product receptacle 108 to the next selected ice cream dispenser 114, followed by positioning below the outlet 31 of the second selected toppings transparent conductor 14, etc., until the product is fully assembled. The robotic arm 16 then places the filled product receptacle 108 at port 120 where it will be transported through the door mechanism 62 where it can be retrieved by the customer.

EXAMPLE 3

Crushed Ice Treat

A vending machine 10 of the present invention possesses ice that is crushed and/or generated and six different liquid toppings (lemon-lime, orange, banana, watermelon, cherry, and grape). Each topping is contained in a separate transparent toppings container 18 that is placed directly over a transparent, coiled glass tube conductor 14. The bottom of each toppings container 18 possesses a valve for controlling the amount of topping that will be dispensed. The vending machine 10 is activated by a customer inserting a token. The user interface touch screen panel 34 then asks the customer to select three toppings. The robotic arm 16 then acquires a product receptacle 108 from a product receptacle dispensing station 109 and places the product receptacle 108 below the ice dispenser 114. Next, the robotic arm 16 then moves the product receptacle 108 to a position below the outlet 31 of the transparent conductor 14 that connects to the selected toppings container 18. The valve is then activated to deliver a measured amount of the first selected topping to the top of the transparent conductor 14, whereupon the selected topping is transported by gravity to the top of the crushed ice in the product receptacle 108. After delivery of the first topping is complete, the robotic arm 16 moves the product receptacle 108 to the next selected topping dispensing station 15 and then again until the product is fully assembled. The robotic arm 16 then moves the filled product receptacle 108 to port 120 where it is transported through the door mechanism 62 where it can be retrieved by the customer.

EXAMPLE 4

Espresso/Cappuccino/Coffee

A vending machine 10 of the present invention possesses espresso/cappuccino/coffee made real time by an existing espresso/cappuccino/coffee machine, steamed or frozen/slurry milk and multiple liquid flavoring options/toppings and other various and sundry toppings. Each flavoring and the milk are contained in separate transparent containers 18 that are placed directly over a transparent, coiled glass tube conductor 14. The bottom of each container 18 includes a valve for controlling the amount of flavoring/milk that will be dispensed. A customer inserting a token activates the vending machine 10. The user interface touch screen panel 34 then allows the customer to select the type of coffee, the flavor, the milk (slurry or steamed) as well as other topping options that may be available such as whipped cream, chocolate powder, sprinkles, cinnamon, and the like. The robotic arm 16 then acquires a product receptacle 108 from a product receptacle dispenser 110 and places the product receptacle 108 below the espresso/cappuccino/coffee dispenser 114, which receives the freshly made espresso/cappuccino/coffee. The robotic arm 16 then moves the product receptacle 108 to a position below the outlet 31 of the transparent conductor 14 that connects to the selected flavor container 18. The valve is then activated to deliver a measured amount of the selected flavor to the top of the transparent conductor 14, whereupon the selected flavoring is transported by gravity to mix with the espresso/cappuccino/coffee in the product receptacle 108. After delivery of the flavoring, the robotic arm 16 moves the product receptacle 108 to the steamed or slurry milk and then other selected toppings until the product is fully assembled.

The robotic arm 16 then places the filled product receptacle 108 at port 120 where it is transported through the first door mechanism 62 where the customer can retrieve it.

Although frozen confectionary type products have been discussed primarily above, it will be understood by immediately preceding description that coffee based beverages could also be provided, whether hot or cold, along with various other products, such as providing the ability to decorate a cake with a selected design and watching the decoration take place on top of a selected flavor of cake, or providing the ability to assemble an assortment of candies (such as multiple flavors of jelly beans). Additionally, while the robotic arm 16 principally moves the product receptacle 108, it could also be utilized to move at least an outlet of a dispenser such as of ice cream, toppings, etc. relative to a product receptacle 108 while allowing viewing of at least a portion of the process by the customer.

FIGS. 7-19 show a second embodiment of a frozen confectionary vending machine, generally indicated at 310, and illustrate how machine 310 is used. Machine 310 is substantially identical in structure and function to machine 10 but possesses several enhancements including a different external shape, enhanced computer programming delivered through the user interface 312 and associated computer processing unit (not shown), as well as an improved robotic arm 316. All of these enhancements will be discussed in greater detail hereafter. Machine 310 is configured to be operationally engaged with a kiosk. The kiosk can be configured in a variety of ways, with a first embodiment thereof being shown in FIG. 7 and indicated generally at 400, a second embodiment thereof being shown in FIG. 11 and indicated generally at 500 and a third embodiment thereof being shown in FIG. 12 and indicated generally at 600.

Figure 7:
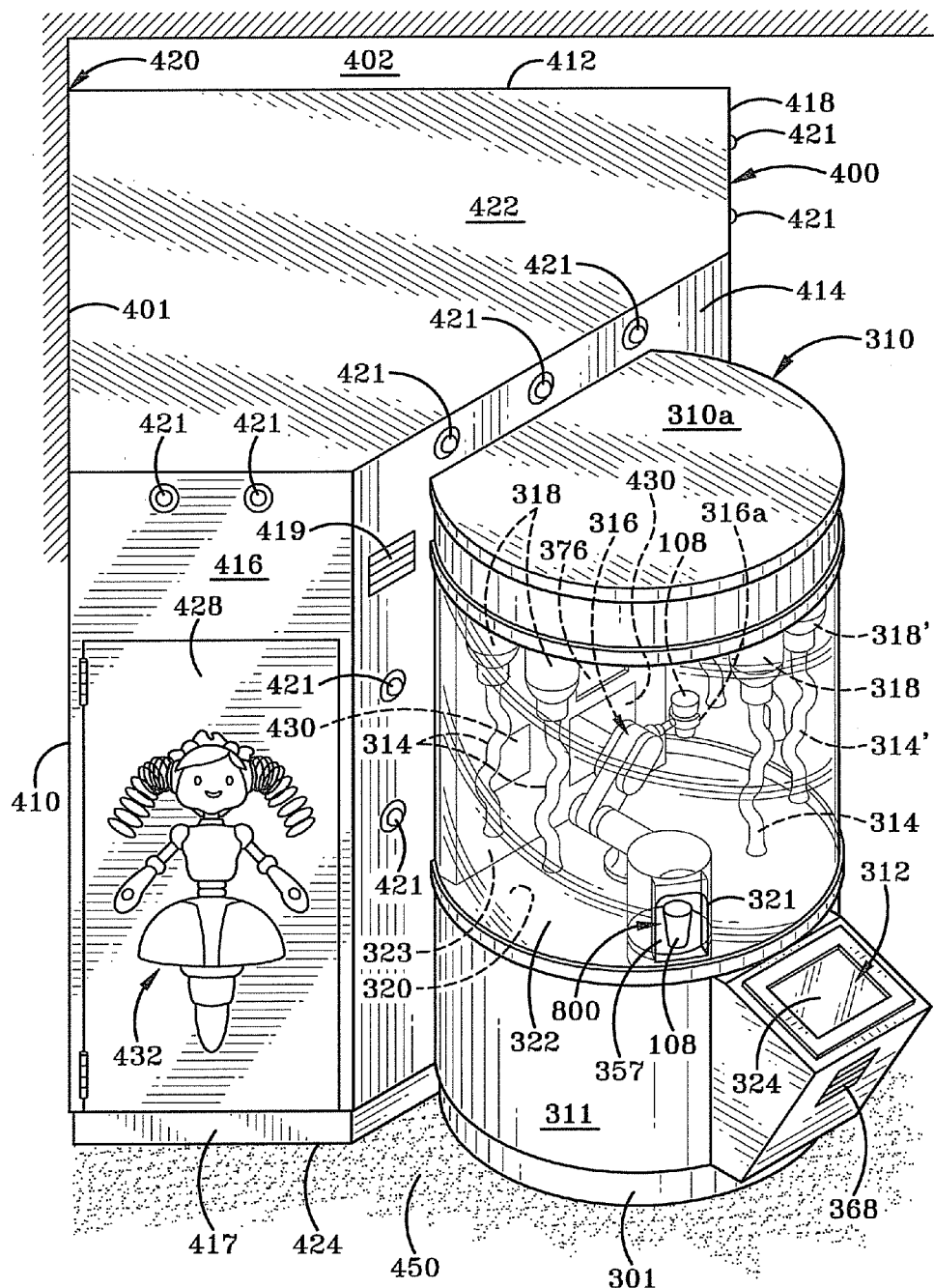
FIG. 7 is a perspective view of a second embodiment of a frozen confectionary vending machine operationally engaged with a first embodiment of a kiosk according to the present invention.
Figure 8:
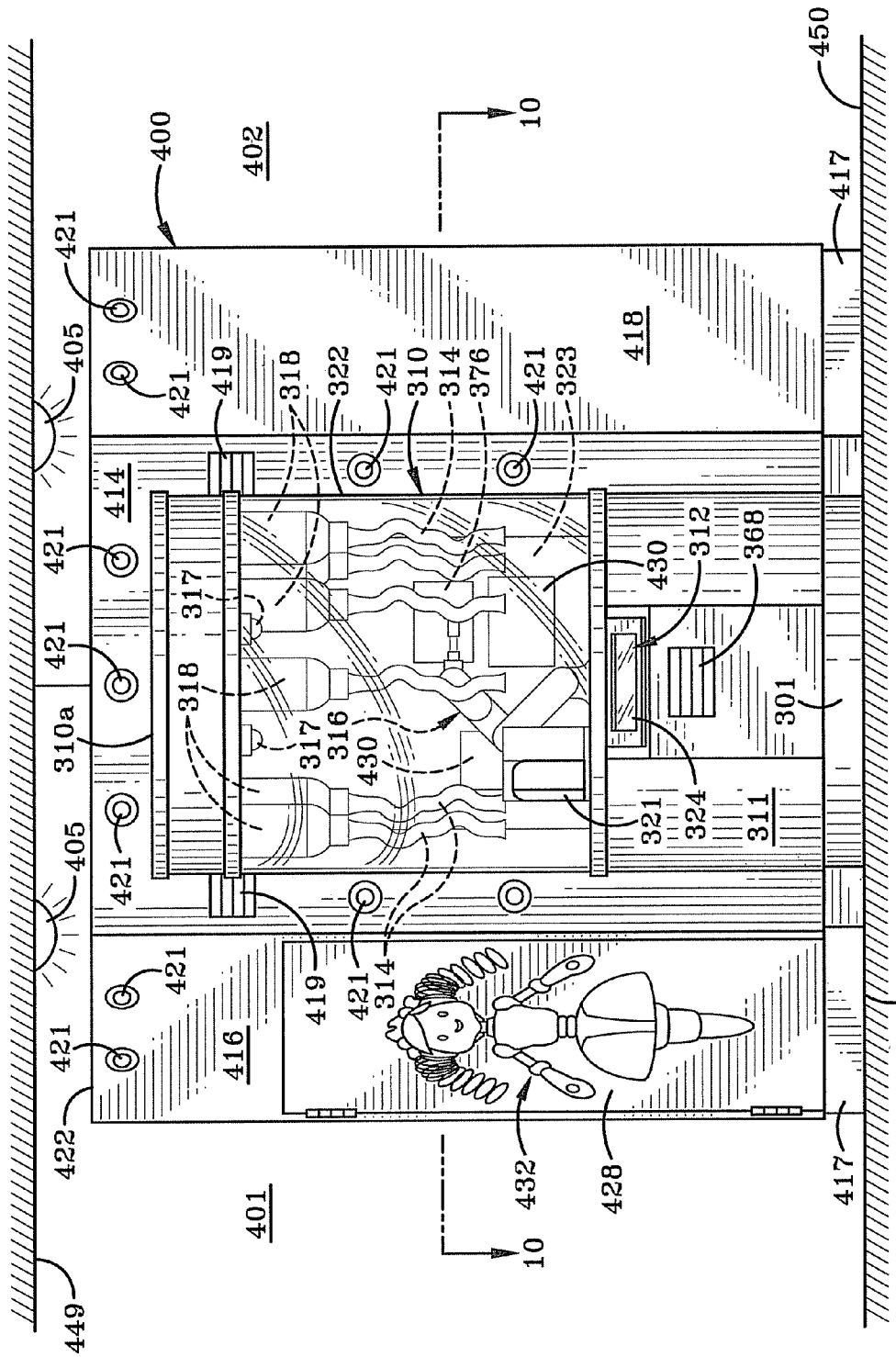
FIG. 8 is a front view of the kiosk and machine of FIG. 7.
Figure 9:
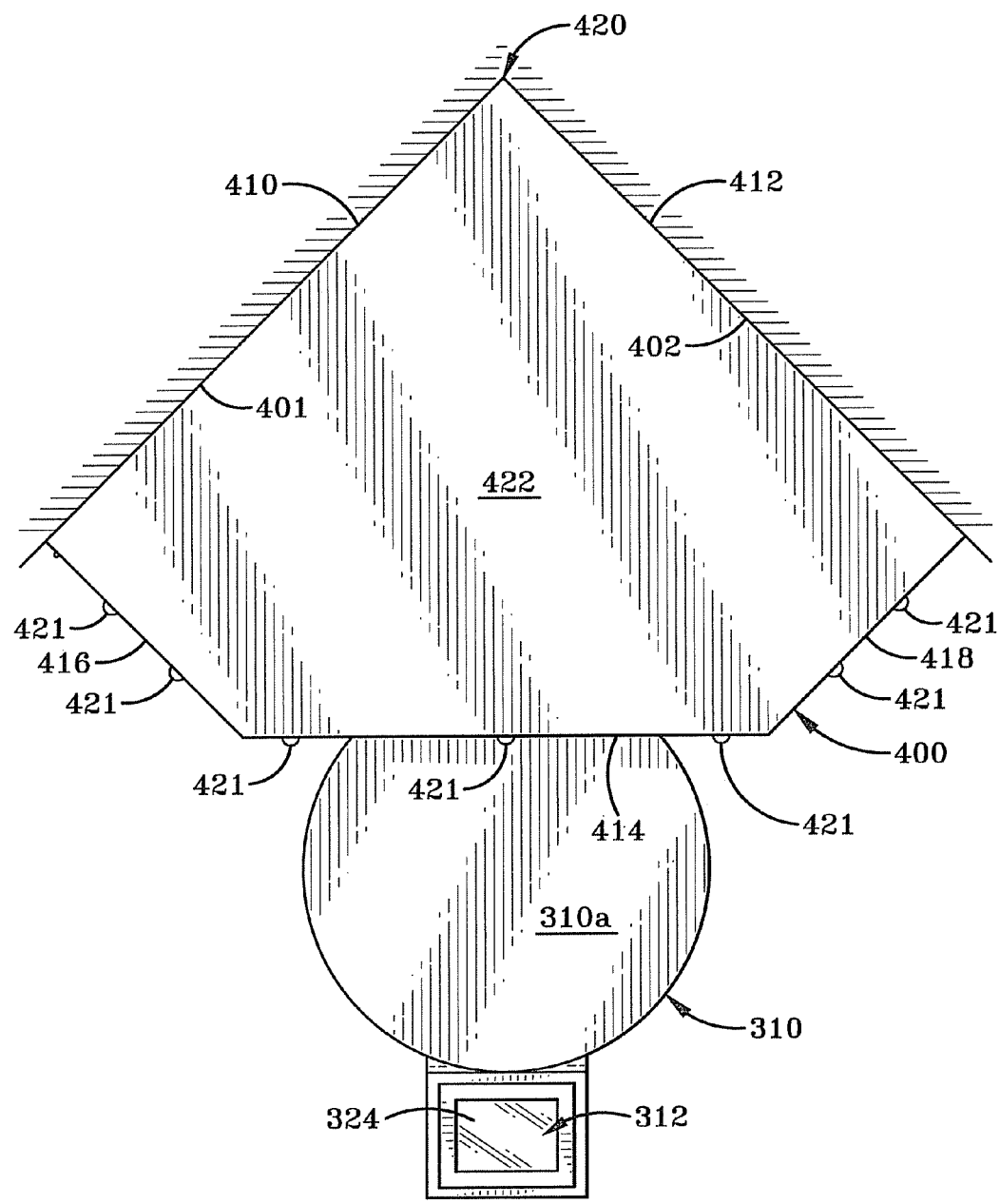
FIG. 9 is a top view of the kiosk and machine of FIG. 8.

Referring to FIG. 7, kiosk 400 is designed to fit within a corner region of an entertainment complex, mall or other selected vending location. Kiosk 400 is therefore designed to be positioned at an intersection of a first and second wall 401, 402. Kiosk 400 includes a left rear wall 410, a right rear wall 412, a front wall 414, a left side wall 416 and a right side wall 418. Left and right rear walls 410, 412 are configured to meet at a corner 420 at right angles to each other. When positioned in the desired location, left rear wall 410 will be disposed in abutting contact with first wall 401 and right rear wall 412 will be disposed in abutting contact with second wall 402. A lighting display panel 403 preferably is positioned on a ceiling region 404 above kiosk 400 and vending machine 310. Lights 405 in panel 403 are positioned to illuminate kiosk 400, machine 310 and a portion of a floor region 405 immediately in front of machine 310. Thus, a potential customer is clearly able to see kiosk, vending machine 310 and user interface 312.

Figure 10:
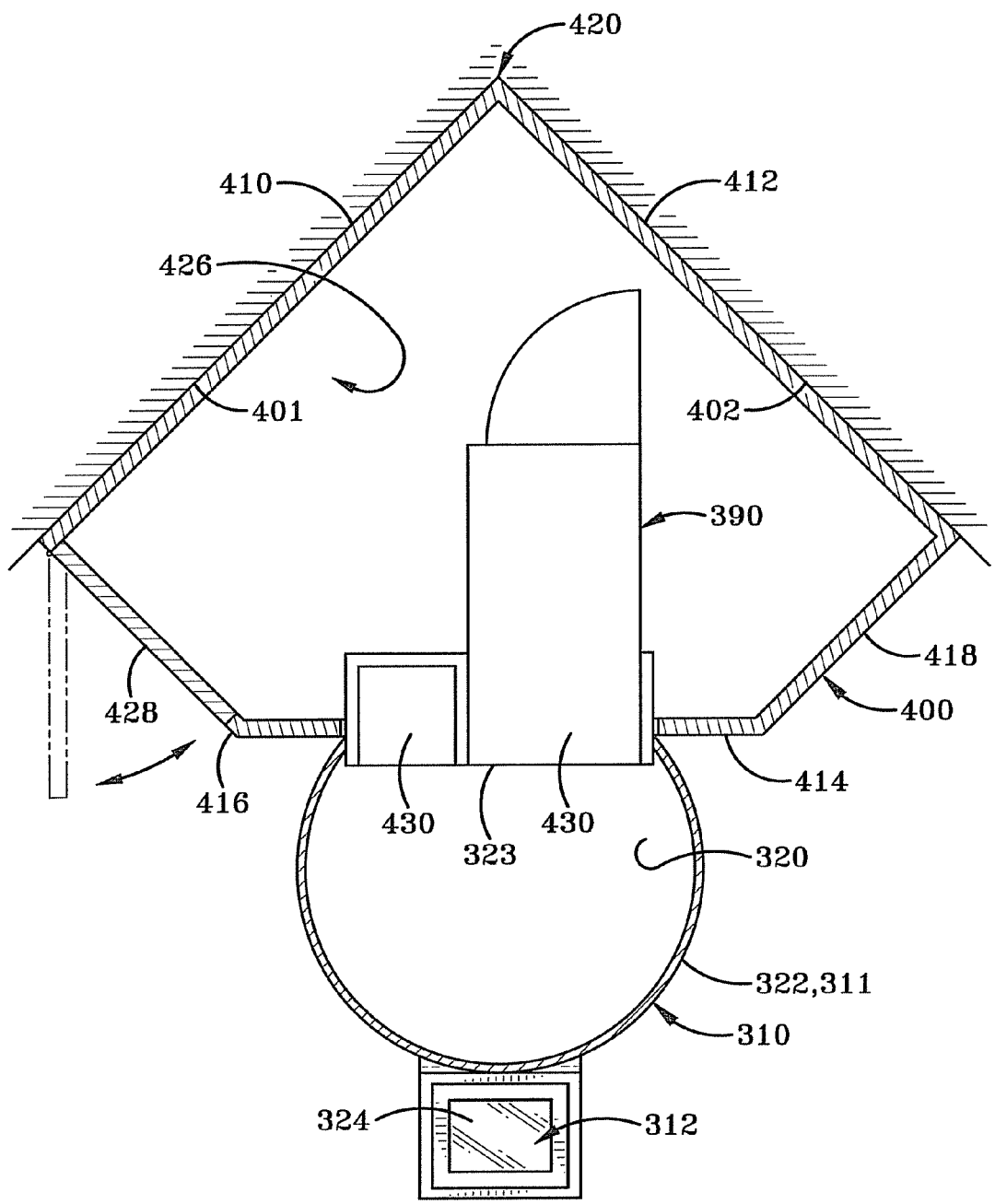
FIG. 10 is a cross-sectional top view of the kiosk and machine taken along line 10-10 of FIG. 8 with all of the functional components of the vending machine removed for clarity.

Front wall 414 of kiosk 400 preferably is disposed generally at a angle of 45 degrees relative to both of left and right rear walls 410, 412 and is spaced a distance forwardly away therefrom. Front wall 414 does not intersect with left and right rear walls 410, 412. Instead, left side wall 416 extends between front wall 414 and left rear wall 410 and right side wall 418 extends between front wall 414 and right rear wall 412. Preferably, left side wall 416 is disposed at right angles to left rear wall 410 and at around 135 degrees to front wall 414, and right side wall 418 is disposed at right angles to right rear wall 412 and at around 135 degrees to front wall 414. Kiosk 400 further includes a top wall 422 and bottom wall 424. It will be understood that top wall 422 and bottom wall 424 may be omitted if desired. The rear walls 410, 412, front wall 414, side walls 416, 418, top and bottom walls 422, 424 surround and define an interior chamber 426 (FIG. 10). Both of kiosk 400 and vending machine 310 may be provided with a kick plate region 417, 301, respectively, so that a user will not accidentally stub their toes against either component. As is evident from FIG. 1, vending machine 310 preferably shorter than kiosk 400 in that top wall 310a of machine 310 is positioned a distance beneath top wall 422 of kiosk 400.

In accordance with one of the specific features of the present invention, one of left side wall 416 and right side wall 418 is provided with a door 428 that provides access into chamber 426. Door 428 may open outwardly, as illustrated in FIG. 10, may be removable, or may open inwardly. Furthermore, door 428 may constitute a portion of the one of the left and right side walls 416, 418 or may be the entire one of the left and right side walls 416, 418.

In accordance with one of the specific features of the present invention and as shown in FIG. 10, front wall 414 defines one or more access openings 430 therein. Openings 430 are positioned in such a location as to be disposed in that portion of front wall 414 that is on operational engagement with rear wall 323 of machine 310. Openings 430 provide communication between chamber 426 of kiosk 400 and interior 320 of machine 310. Openings 430 can be used for positioning the product receptacle dispenser, ice cream dispenser or simply a port for restocking containers 18. Additionally, portions of the functioning components 390 of machine 310 may be positioned within chamber 426 of kiosk 400. Although not illustrated herein, such components may include a refrigeration system and motor to drive robotic arm 316, for example. The positioning of these types of components within chamber 426 allows a service technician to gain easy access to the same. It will be understood that chamber 426 is of a sufficiently large enough size to allow the technician to enter chamber 426 and close the door 428 behind him and still have enough room to work on the components 390. Access openings 430 are provided in front wall 414 of kiosk 400 so that a technician will have access into interior 320 of machine 310. Thus, a service technician positioned within chamber 426 is able to service components within interior 320 and is able to restock ingredient containers 318 essentially out of sight of potential customers. Although not illustrated herein, it will be understood that kiosk 400 will be provided with at least one light located on one of the interior walls so as to enable a service technician to see when in chamber 426.

In accordance with yet another specific feature of the present invention, the exterior surfaces of front wall 414, left side wall 416, right side wall 418 and vending machine 310 may all be provided with graphic images 432 that add to the entertainment factor of the kiosk 400. Graphic images 432 may constitute depictions of the characters that will be displayed on user interface 312 as hereinafter described. Additionally, images 432 may include images of the possible frozen confectioneries that may be assembled within kiosk 400, trademarks, and/or instructions for the potential user.

Figure 11:
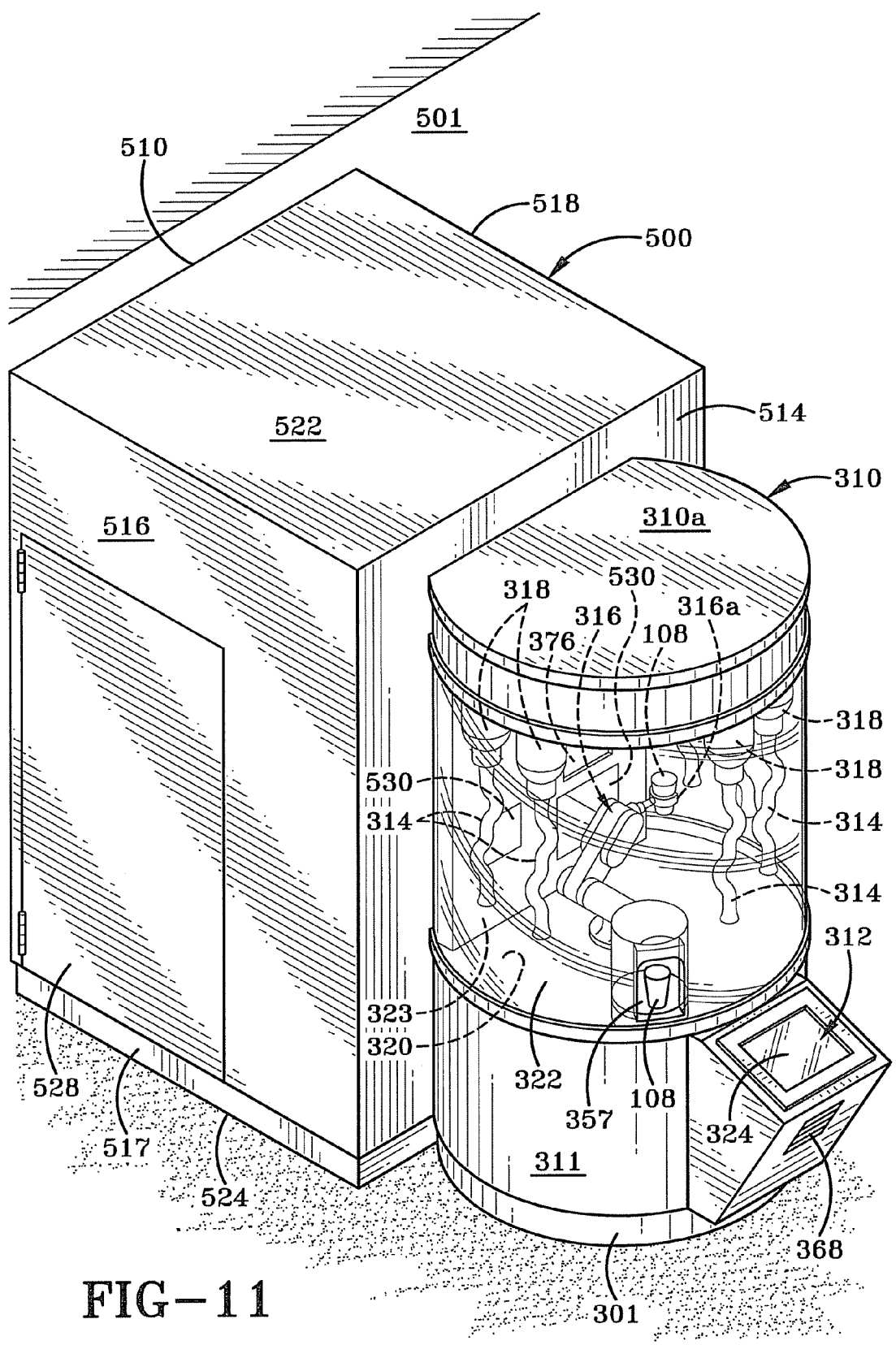
FIG. 11 is a perspective view of the second embodiment of the frozen confectionary vending machine operationally engaged with a second embodiment of a kiosk according to the present invention.
Figure 12:
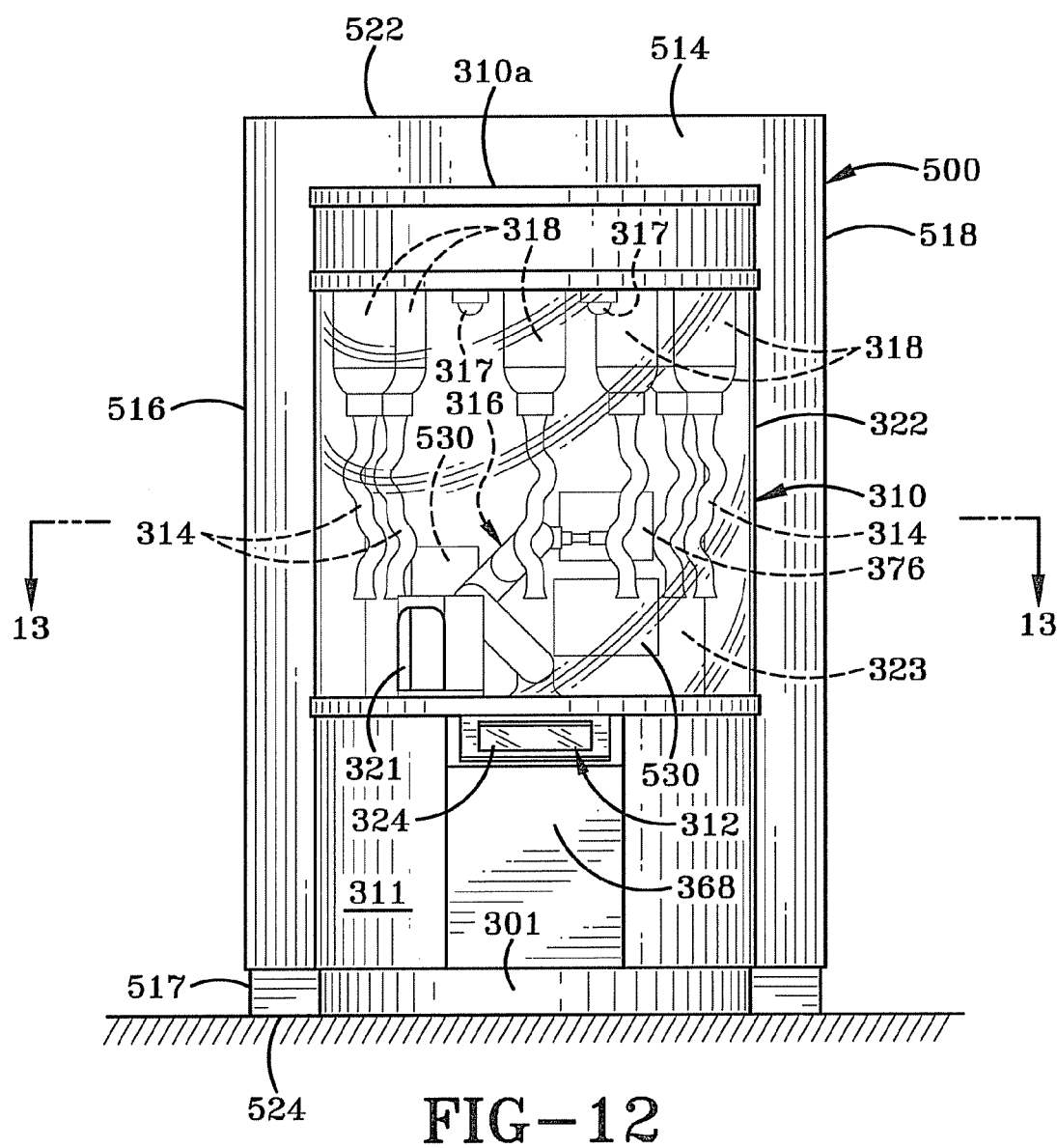
FIG. 12 is a top view of the kiosk and machine of FIG. 11.
Figure 13:
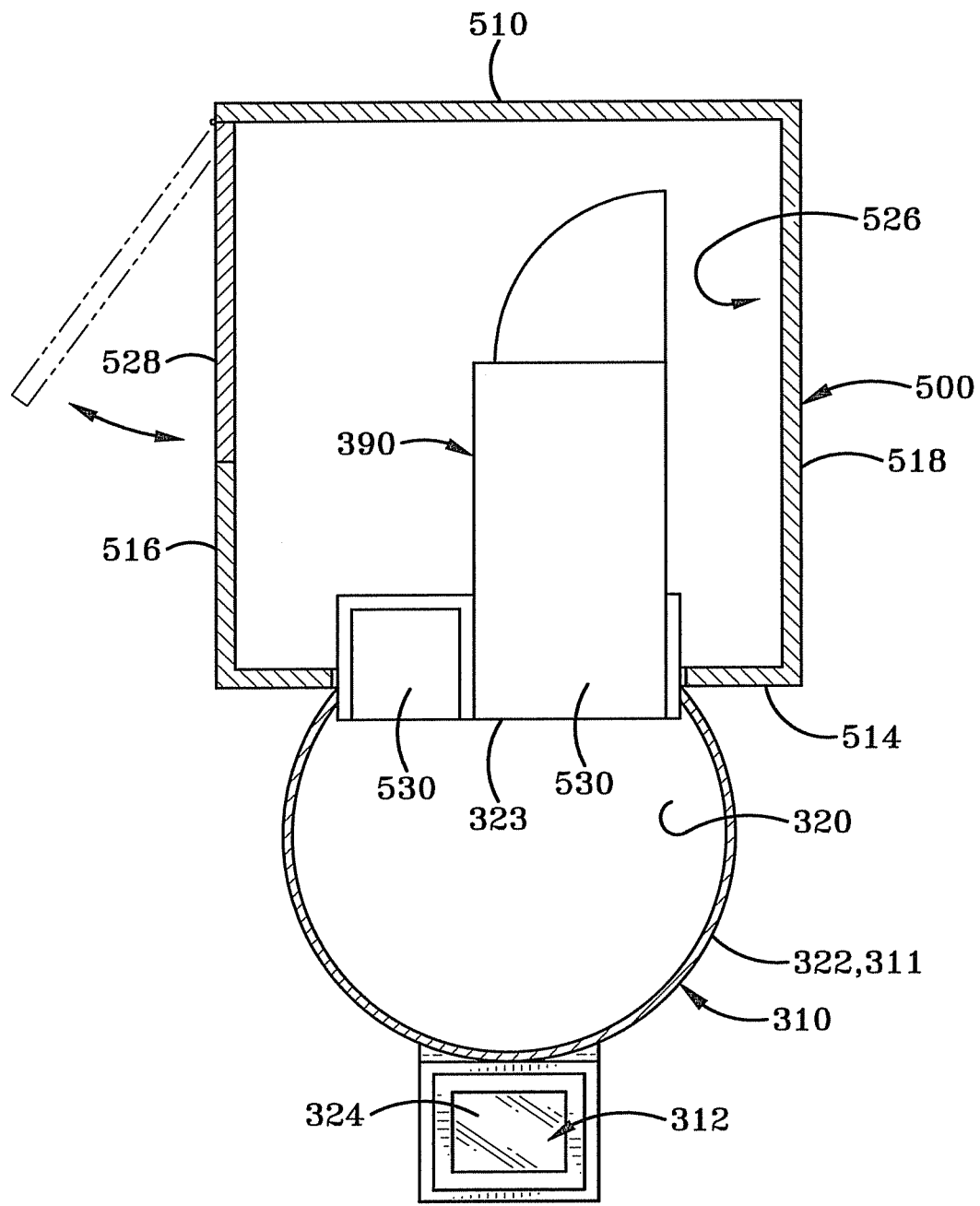
FIG. 13 is a cross-sectional top view of the kiosk and machine taken along line 13-13 of FIG. 12 with all of the functional components of the vending machine removed for clarity.

FIGS. 11-13 illustrate a second embodiment of a kiosk in accordance with the present invention, with said kiosk being generally indicated at 500. Kiosk 500 is configured to be positioned in front of a flat wall 501 in any desired vending location. As with kiosk 400, kiosk 500 is operationally engaged with vending machine 310. Kiosk 500 includes a rear wall 510, a front wall 514, a left side wall 516 and a right side wall 518. Preferably, rear wall 510 is generally parallel to front wall 514 and left side wall 516 is generally parallel to right side wall 518. Kiosk 500 further includes a top wall 522 and a bottom wall 524. Rear, front, left side, right side, top and bottom walls 510, 514, 516, 518, 522 and 524 surround and define an interior chamber 526 (FIG. 13). One of left side wall 516 and right side wall 518 is provided with a door 528. Door 528 may form a portion of the one of left and right side walls 516, 518 or may be the entire one of the left and right side walls 516, 518. As with kiosk 400, door 528 provides an entryway for a service technician to access chamber 526 of kiosk 500. Front wall 514 is provided with one or more access openings 530 therein that will allow for communication through walls 514 and 323 between chamber 426 of kiosk 500 and interior 320 of vending machine 310. Additionally, portions of the functioning components 390 of vending machine 310 may be provided within chamber 526 of kiosk 500. Both of kiosk 500 and vending machine are preferably provided with kick plates 517 and 301, respectively. Once again, top wall 310a of vending machine 310 preferably is disposed a distance beneath top wall 522 to enhance the aesthetics of the combination of the kiosk and machine.

Figure 14:
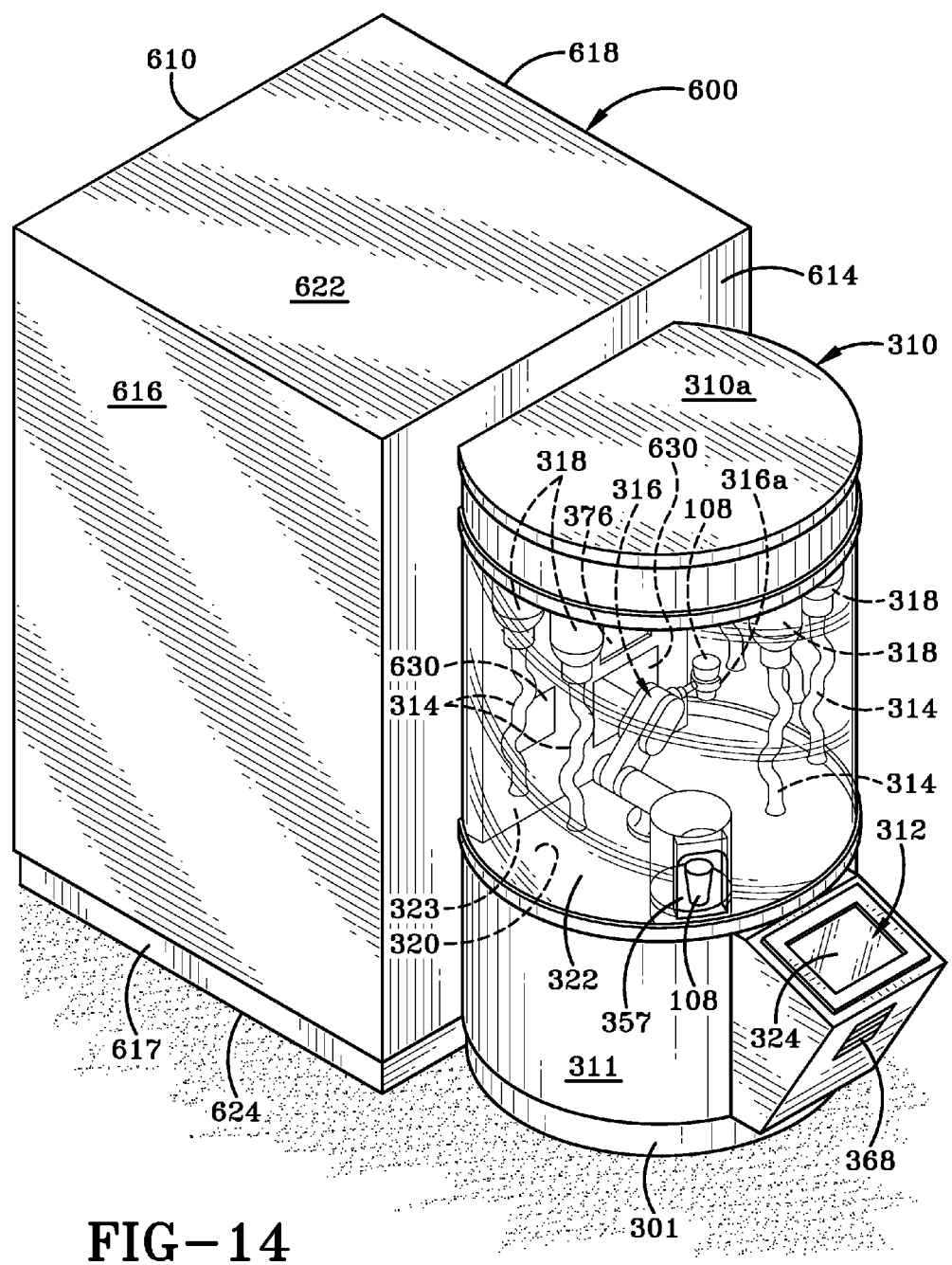
FIG. 14 is a perspective view of the second embodiment of the frozen confectionary vending machine operationally engaged with a third embodiment of a kiosk according to the present invention.
Figure 15:
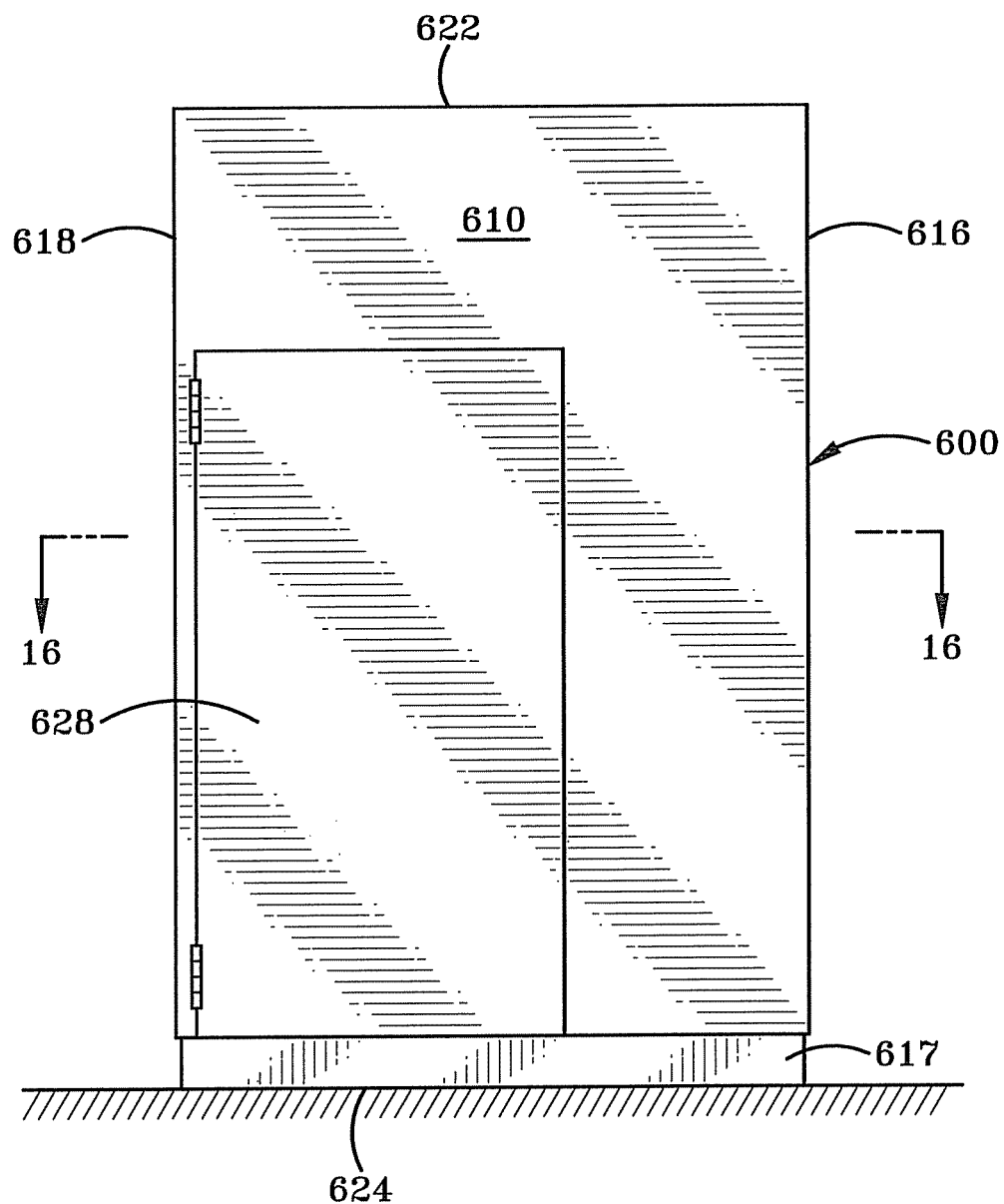
FIG. 15 is a rear view of the kiosk and machine of FIG. 14.
Figure 16:
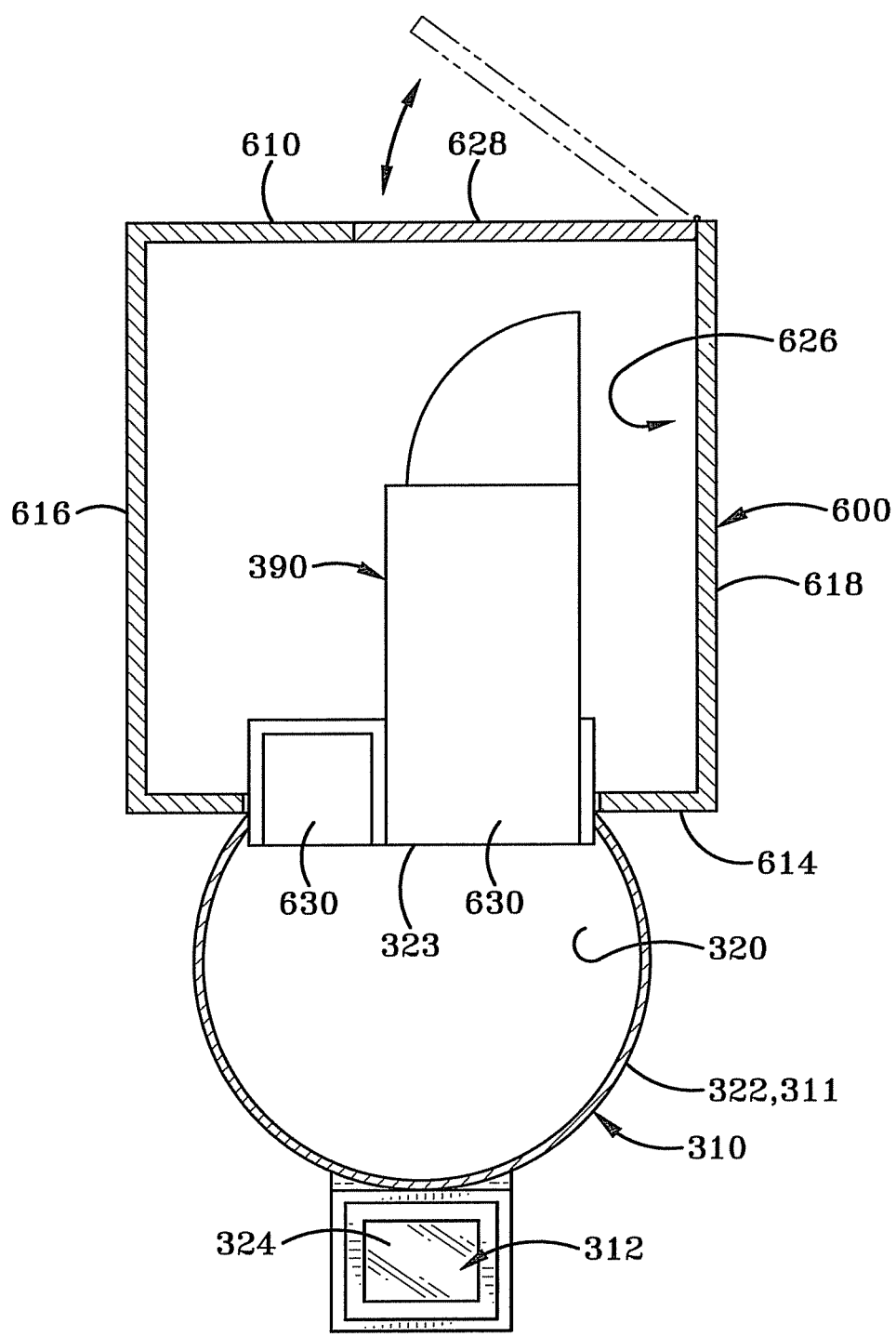
FIG. 16 is a cross-sectional top view of the kiosk and machine taken through line 16-16 of FIG. 15.

FIGS. 14-16 illustrate a third embodiment of a kiosk in accordance with the present invention, generally indicated at 600. Kiosk 600 is, one again, operationally engaged with a rear wall 323 of vending machine 310. Kiosk 600 is designed as a free-standing model that does not need to be positioned adjacent a wall in a desired vending location. Instead, kiosk 600 is positionable anywhere within the vending location and spaced a distance from any walls. Kiosk 600 is substantially identical to kiosk 500 with the exception that a door 628 into an interior chamber 626 of kiosk 600 is provided in rear wall 610. Door 628 provides access into chamber 626 defined between the previously mentioned walls 610, 616, 618 and a front wall 614, top wall 622 and bottom wall 624 of kiosk 600. As with the previous two embodiments of the kiosk, kiosk 600 is provided with a kick plate 617 and the top wall 310a of vending machine 310 is recessed relative to top wall 622 of kiosk 600. Kiosk 600 also includes access ports 630 for placement of the container dispenser, ice cream dispenser etc.

Inasmuch as the above-described kiosks in accordance with the present invention are designed to be used for the custom production of a foodstuff or beverage, the various surfaces of the kiosk, particularly the interior surfaces of the rear, front, left and right side walls that define the interior chambers thereof preferably are constructed from materials that enable them to be easily and adequately cleaned and sterilized to meet health and safety regulations. For example, the interior surfaces may be constructed of materials such as aluminum, stainless steel or heavy-duty industrial plastics.

Figure 13A:
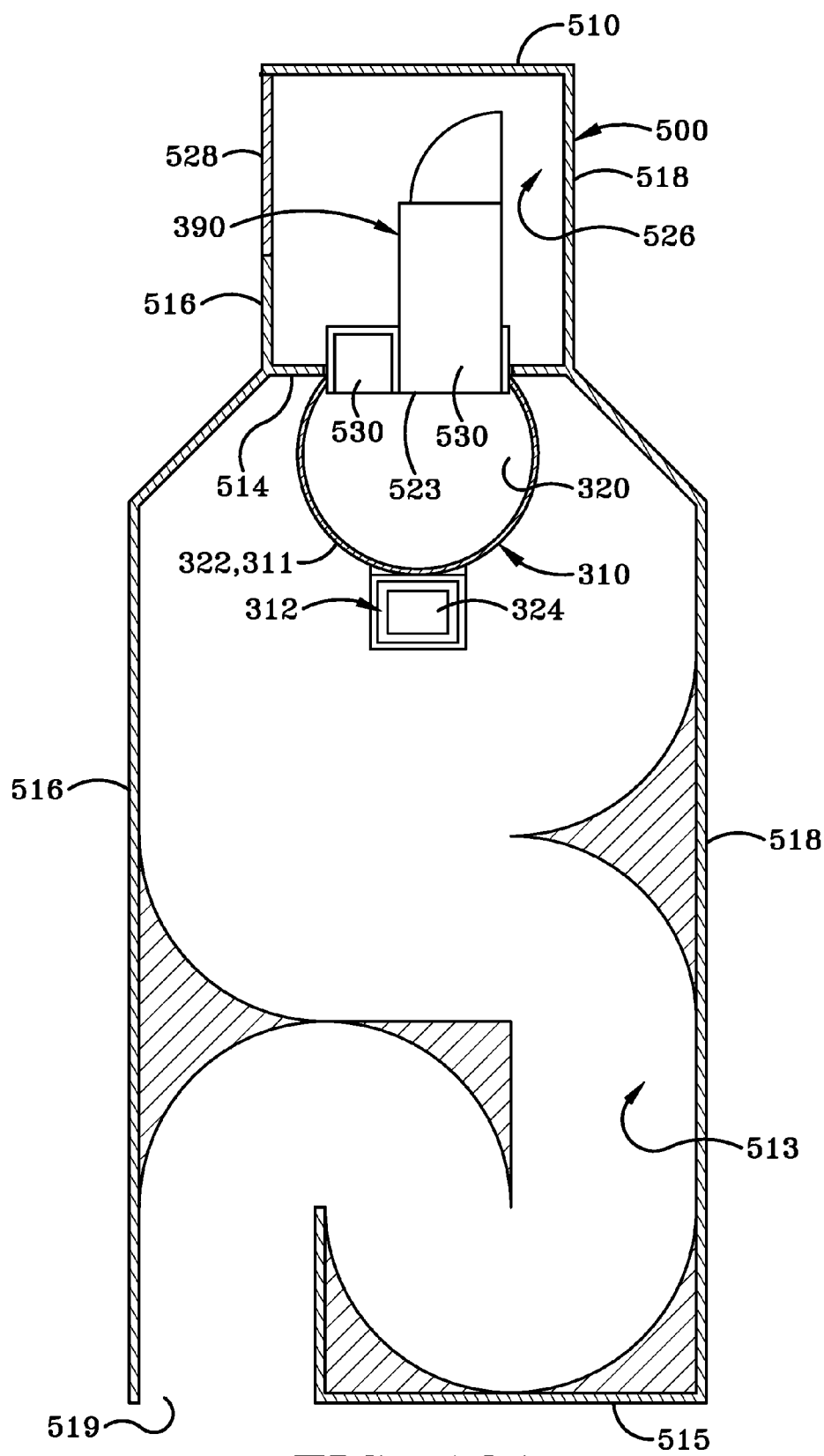
FIG. 13A is a cross-sectional top view of an alternative embodiment of the kiosk and machine.

It will be understood that a kiosk in accordance with the present invention may be configured in any other aesthetically pleasing manner without departing from the scope of the present invention. For instance, left and right rear walls 410, 412 of kiosk 400 may extend for a distance beyond left side wall 416 and right side wall 418 to provide additional display areas. Furthermore, bottom wall 424 and top wall 422 thereof may extend forwardly beyond user interface 312 to provide a ceiling and a floor that extends for a distance beyond front wall 414 and left and right side walls 416, 418 to define a space around vending machine 310. Additionally, all of the front, rear, left and right side walls of the kiosk may be curved. An additional front wall 515 (FIG. 13A) may be spaced outwardly beyond user interface 312 and left and right side walls 516, 518 extended so that vending machine itself is retained within a chamber 521, passageways 513 may be provided into this chamber 521 to reach vending machine 310. Furthermore, additional design features may be incorporated into the kiosk to increase and enhance the entertainment experience for the user. For example, if passageways are provided to a chamber that surrounds kiosk and vending machine, then lights may be positioned in any one of the floor, walls, and ceiling thereof. Speakers may also be provided in various locations in one or both of kiosk and vending machine to transmit sounds and music into the passageways or into the open area surrounding vending machine 310. Any other entertainment type features may also be provided on the walls of the kiosk and vending machine. For example, glow-in-the dark treatments, lasers, smoke generated by dry ice, scent emitting devices, and tactile treatments may also be incorporated into the kiosk and vending machine in accordance with the present invention. All of these elements may be utilized to create an amusement and entertainment experience that involves as many of the user's senses as possible.

In accordance with a specific feature of the present invention, the second embodiment of the frozen confectionary vending machine 310 in accordance with the present invention is differently shaped to machine 10. Machine 310 is provided with a curved front wall 311 and a planar rear wall 323. Front wall 311 and curved viewing window 322 inscribe a semi-circular path of around 315 degrees. Window 322 thus permits viewing into the interior 320 of machine 310 for all but about 45 degrees of the circumference thereof. Machine 310 further includes an enhanced user interface 312 as will be hereinafter described. Furthermore, control of machine 310 is provided by a computer (such as computer 27 in FIG. 3A) that is operationally linked with user interface 312. The computer preferably includes a processing unit similar to those provided in personal computers. The computer is provided with enhanced programming and image generation relating to the production of the frozen confectionery. Back wall 323 of vending machine is also provided with one or more display screens 376. It will be understood that kiosk 400, for example, may similarly be provided with one or more display screens in any of its front and side walls 414, 416, 418 and in its rear wall 710 in the free standing version 700. Additionally, an improved robotic arm 316 is utilized in machine 310. Preferably robotic arm 316 is a five axis articulated robotic arm such as those manufactured by DENSO Robotics of Long Beach, Calif. (The robotic arm 16 utilized in machine 10 is a three axis robotic arm.)

Figure 17:
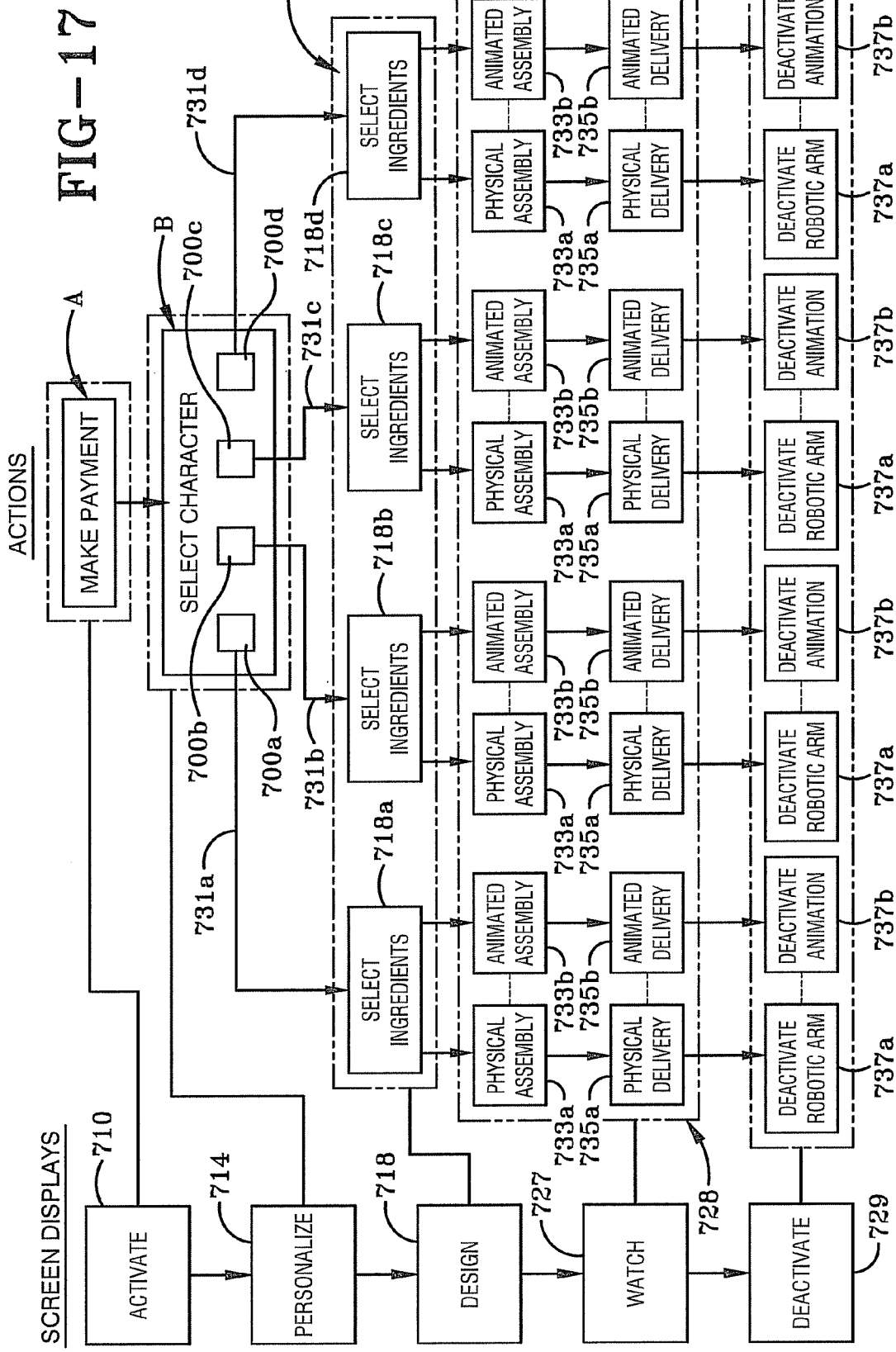
FIG. 17 is a flow chart showing the assembly of a frozen confectionary utilizing the vending machine of FIGS. 7-16.

A flow chart indicating the enhanced use of vending machine 310 is provided in FIG. 17. Referring to FIGS. 17-21, this description references kiosk 400 but will be understood to apply equally to kiosks 500 and 600. When a potential user approaches kiosk 400 music is playing through speakers 419 (FIG. 8) and lights 421 are flashing. The music and lights may be motion activated. A colorful, welcoming first screen display 710 (FIG. 18) lights up on a touch screen 324 on user interface 312. Touch screen 324 preferably is substantially similar to the types of touch screen provided on personal computers. User interface 312 preferably is therefore of such a nature that it can be easily operated by persons as young as two years old. It will, of course, be understood that any other type of user interface 312 that permits the user to view or hear how to operate machine 310 is considered to fall within the scope of this invention. The following description references how to operate the touch screen 324 and the manner of selecting and inputting information into the same. It will be understood that other methodology that is specific to other types of user interface for reviewing and inputting data will be appropriate for the particular interface provided on vending machine 310.

Figure 18:
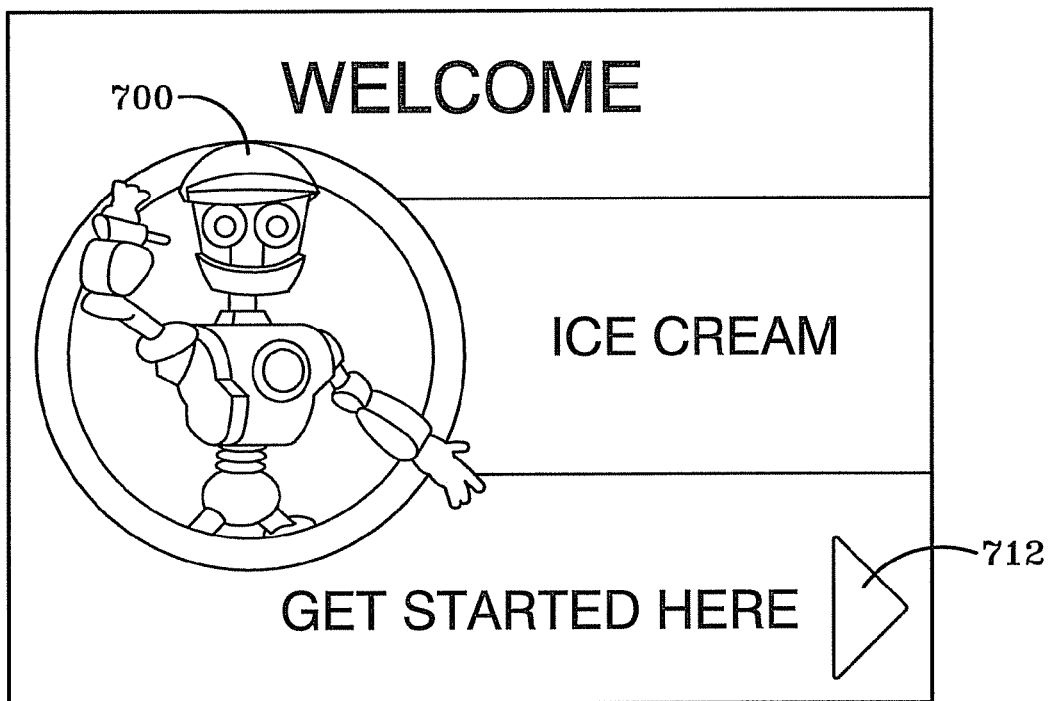
FIG. 18 is an exemplary first screen display welcoming the user to the vending machine.
Figure 19:
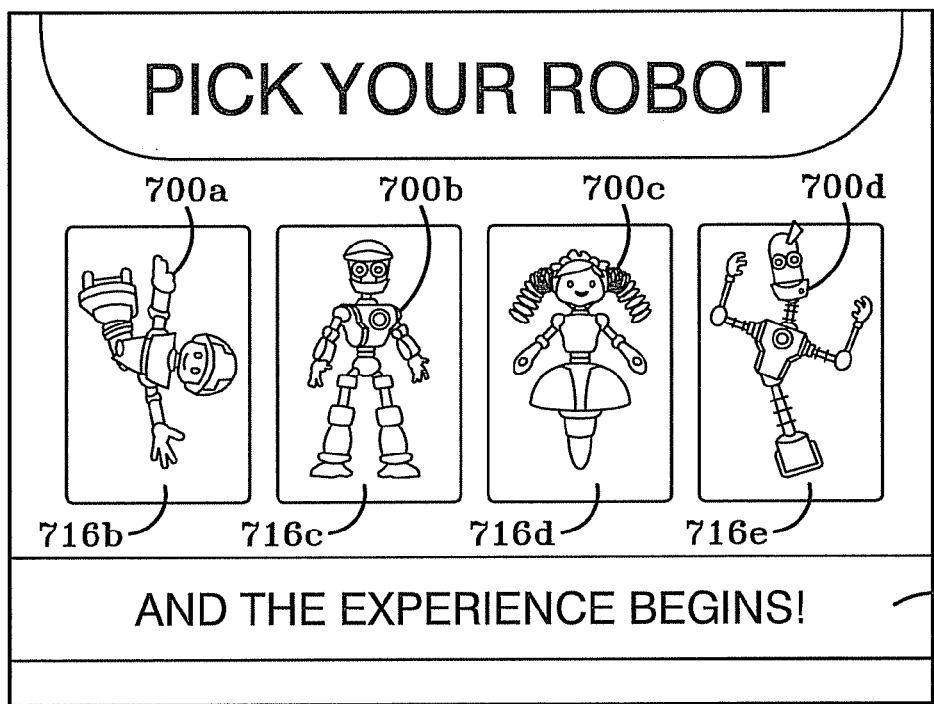
FIG. 19 is an exemplary second screen display inviting the user to personally select an animated robotic character to usher them through the assembly process.
Figure 20:
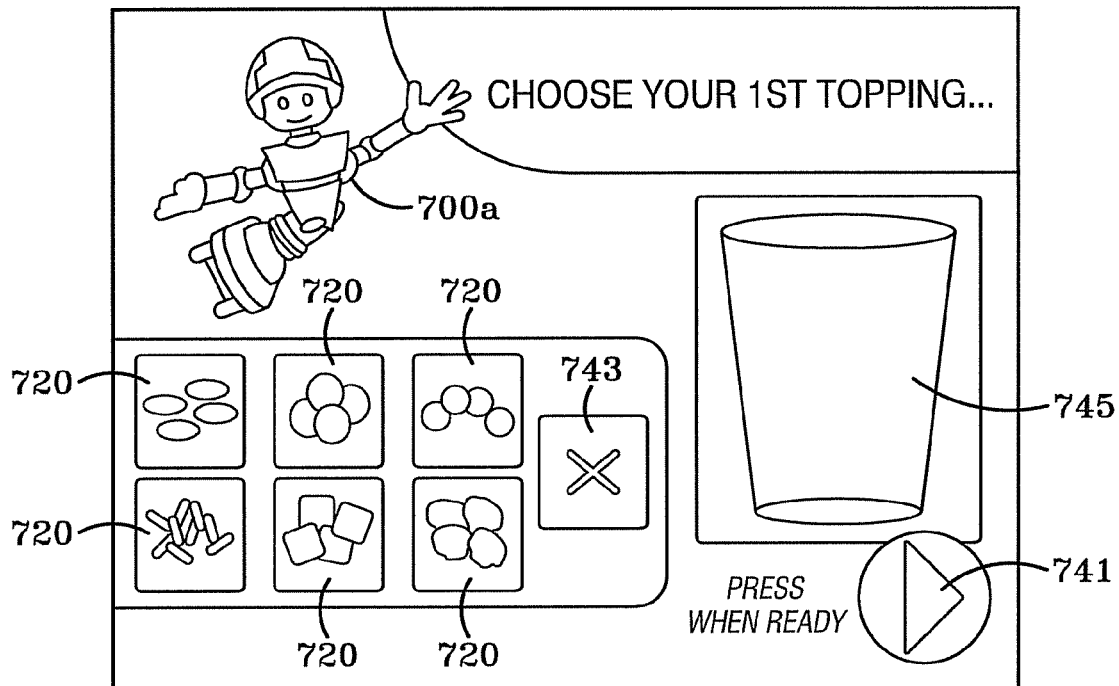
FIG. 20 is an exemplary third screen display inviting the user to personally select the ingredients for incorporation into their frozen confectionary and to select the order those ingredients are assembled.

FIG. 18 is exemplary of a first screen display 710 that welcomes the user to vending machine 310. First screen display 710 shows a first character 700 that personifies robotic arm 316 (FIG. 7) used in machine 310. The term "characters" as used herein should be considered to cover all types of images that can be selected by the user. These can include robotic characters, as depicted herein and as used in the preferred embodiment of the invention, cartoon characters, letters, numbers, symbols, photographs or any other type of selectable visual image. The term "robotic characters" as used herein should be broadly interpreted as any type of graphic representation that is selectable by the user.

First screen display 710 invites the user to begin assembly of their frozen confectionary. The user activates the machine by paying with any acceptable form of payment such as is shown in FIG. 17 by the reference character "A". Although not illustrate herein, payment may be made in any format including inserting coins or bills into a pay slot, inserting tokens into a pay slot, swiping a card through a card reader, entering a number into the user interface or scanning any required or acceptable payment means. First screen display 710 appears on touch screen 324 immediately prior to or immediately after the user has made payment by any acceptable method. The user touches the start indicator 712 on first screen display 710 to advance to a second screen display 714.

The enhanced computer programming in machine 310 allows the user to personalize his or her experience for assembling their frozen confectionary. The action of personalizing the experience is referenced by "B" in FIG. 17 and a second screen display 714 relating thereto is also shown in this figure. Machine 10 permitted the user to select the various frozen confectionaries and toppings that will be used to assemble their personalized frozen treat, as has been previously described herein. Machine 310 is additionally provided with enhanced computer programming that permits the user to select an animated robotic character 700a-700d to walk and coach them through the assembly procedure. Second screen display 714 (FIG. 19) includes a plurality of display regions 716b, 716c, 716d, 716e, each of which is provided with an image of one of a plurality of programmed virtual robotic characters 700a, 700b, 700c, 700d thereon. Robotic characters 700-700d are utilized to increase the personal interaction of the user with vending machine 310 as they appear to coach and guide the user through the assembly process. These robotic characters 700a-700d are operable on a first circuit sequence provided in machine 310. The first circuit sequence is operatively connected to user interface 312 and controls a user output. User interface 312 is operationally linked to robotic arm 316 and dispensing stations 318. The user output includes but is not limited to lights 421, speakers 419, 368, display screen 376, touch screen 324, scent generators (not shown) and any other devices which will enhance the user's experience. The first circuit sequence is activated upon entry of a first user input into user interface 312.

It will be understood that any one of a number of different virtual robotic characters may be displayed on second screen display 714. A separate display region 716 will be provided on second screen display 714 for each additional available robotic character. Any additional robotic characters provided on vending machine 310 will also form part of the first circuit sequence. In the preferred embodiment of the invention, the user is provided with the option of selecting one of four robotic characters.

As an aside, it should be noted that kiosks 400, 500 & 600 associated with vending machine 310 may be configured to display graphic images 432 related to the variety of different virtual robotic characters 700 available on that particular machine 310. Furthermore, robotic characters 700a-700d may be customized for the particular vending location and specific client in which vending machine 310 is provided. So, for instance, if vending machine 310 is provided in a theme park of some nature, then characters that are associated with the particular theme park may be displayed in display regions 716b-716e as well in as graphic images 432 on the exterior of vending machine 310 and kiosk 400.

When the user touches any one of the display regions 716b-716e, a short animated vignette may be displayed on touch screen 324 relating to the specific robotic character 700a-700d that was touched and highlighted So, for instance, if the robotic character selected is the one identified by reference number 700a and associated with display region 716a, for instance, the character could be animated to appear to skateboard and will be accompanied by sounds and music that are representative of that type of motion. If the robotic character selected is the one identified as 700c on display region 716c instead, then that robotic character 700c could be animated to move as though they are a ballerina and the sounds and music accompanying that character 700c will be appropriately linked to that type of activity. In other words, each specific robotic character is programmed to move in a unique fashion accompanied by sounds and music associated with the character and with the type of movement. The sounds and/or music are generated by the computer and played over loudspeakers 368, 419, on one or both of vending machine 310 and kiosk 400. Additionally, lights 317, 421 may be caused to flash in a pattern that is linked specifically to the robotic character 700a-700d. In order to select a particular desired robotic character, the user leaves their selection highlighted on second display screen 714 and touches the activation indicator 729 thereon.

This selection causes a third screen display 718 (FIG. 17) to appear on touch screen 324. As shown in FIG. 17, the selection of each robotic character sets up one of a unique set of animated tracks 731a, 731b, 731c and 731d. These tracks are operable on a second circuit sequence provided in machine 310. One of the plurality of animated tracks 731a, 731b, 731c and 731d being automatically initiated upon entry of the first user input. The second circuit sequence is operatively connected to user interface 312 and controls the user output. However the second circuit sequence controls the user output in a different way from the first circuit sequence. Each of the first and second user outputs are operatively associated with robotic arm 316 to assure that the first and second circuit sequences correspond to movements of robotic arm 316.

The animated tracks, which are pre-programmed and stored in the computer operationally linked to user interface 312, each comprise a unique and character-specific animation sequence, a music selection and/or sound selection, and lighting patterns. The animated tracks are linked via user interface 312 with the movements of robotic arm 316. The selection of a specific one of the robotic characters 700a-700d results in the selection of one of the plurality of second circuit sequences. This arrangement allows the user to control their own personal experience with vending machine 310 in that they are able to the type of animated visuals, music, sounds and lighting that appeals to them and will entertain them as they wait for their frozen confectionary to be made. As there are four robotic characters 700a, 700b, 700c and 700d, this selection sets one of four music tracks in machine 310 that correspond with the selected robotic character. Additionally, the selection sets one of four animation tracks that appear to "play" and "interact" with the user. Finally, the selection of the robotic character may also set one of four runs of robotic arm 316 movements that will accompany the assembly of the frozen confectionary.

Regardless of which of the robotic characters 700a-700d is selected, the next action that is undertaken by the user is the selection of the ingredients that they wish to include in their frozen confectionary. The ingredient selections are part of a third circuit sequence operatively connected to user interface 312 and controlling the user output. The third circuit sequence controls the user output in a way different from each of the first the second circuit sequences and the third user output is operatively associated with robotic arm 316 to assure that the third circuit sequence corresponds to movements of the robotic arm.

The third circuit sequence is activated upon entry of a second user input into user interface 312. The act of selecting the ingredients is indicated by the letter "C" in FIG. 17. A customized third display screen 718 appears on touch screen 324. The particular third display screen is dependent upon which robotic character was selected in step "B". The possible third display screens are indicated as 718b, 718c, 718d and 718e. The following description will presume that the user selected robotic character 700a. Third screen display 718a (FIG. 20) offers the user a plurality of ingredient options for their review and selection. Each ingredient option is displayed on an individual display region 720. The user is prompted through one or both of visual and audio cues provided by the selected robotic character 700a to select a product receptacle for the frozen confectionary and to select the various ingredients they wish to have therein. The user may make between 1 and 6 ingredient selections as the frozen confectionary is constructed from six layers of ingredients. The ingredients include any one of a number of frozen confections including but not limited to ice cream, sorbet, custard, frozen yogurt and chipped or shaved ice. The ingredients further include any one of a variety of toppings including a range of syrups, candies and nuts. The computer may be programmed to always present the same options for the frozen confections and toppings or may be programmed to include special ingredients that are only offered during promotions or seasons such as candy cane flavored ice cream at Christmas or candy corn candy toppings at Halloween. The dispensing stations 318 (FIG. 7) for the frozen confections and toppings are filled with the same ingredients that are presented for selection by the computer. An ingredient may be dispensed as many times as the user selects. Additionally, the order of ingredients is completely selected by the user. The user makes their selections in the order they choose for the machine to assemble their treat. Selection of each ingredient is made by touching and therefore highlighting the desired display region 720 and then touching the advance indicator 741. The selection is accompanied by some type of visual and/or auditory confirmation by the selected robotic character 700a and may also be accompanied by flashing lights and/or sounds. Third screen display 718a, also includes a region 743 for removing an ingredient or for switching the ingredient layers around before a final confirmation is given. As the user makes their selections a graphic 745 of the product receptacle on third display screen 718 visually illustrates the layers of the treat being placed into the physical product receptacle 108.

Once the user is happy with their virtual end product as shown on third screen display 718, they initiate the building of their frozen confectionary by touching a proceed indicator 741 on third display screen 718. This action signals to the computer to begin with the physical assembly of the frozen confectionary. At this point, the user's next action is for them to watch the assembly of their treat. This is indicated on FIG. 17 as step 727. Step 727 covers two phases. The first is the assembly of the frozen confectionary and the second is the delivery of the finished product.

To begin the assembly process, the computer sends a signal to activate robotic arm 316. Robotic arm 316 goes about assembling the frozen confectionary within interior 320 of machine 310 according to the selected parameters entered by the user. This physical construction has been previously described herein in reference to vending machine 10. However, the enhanced programming provided in the computer synchronizes the actual physical assembly of the frozen confectionary by robotic arm 316 with an animated assembly of the frozen confectionary shown on a display generally indicated as 376. Display 376 is shown in FIG. 7 as comprising a screen on a rear wall 323 of machine 310. Although not illustrated herein, it will be understood that the display may further or alternatively include one or more screens provided on the walls of kiosk 400, may take the form of a hologram or a projection shown in the interior of machine, on the transparent viewing window 322 thereof or in a location exterior to machine 310 and kiosk 400. In other words, display 376 constitutes any format that may be seen by the viewer.

It will be understood that the visuals shown on display 376 preferably are illustrative in nature, they are not photographed movements of the robotic arm 316, although this type of visual may be included in the display.

Figure 21:
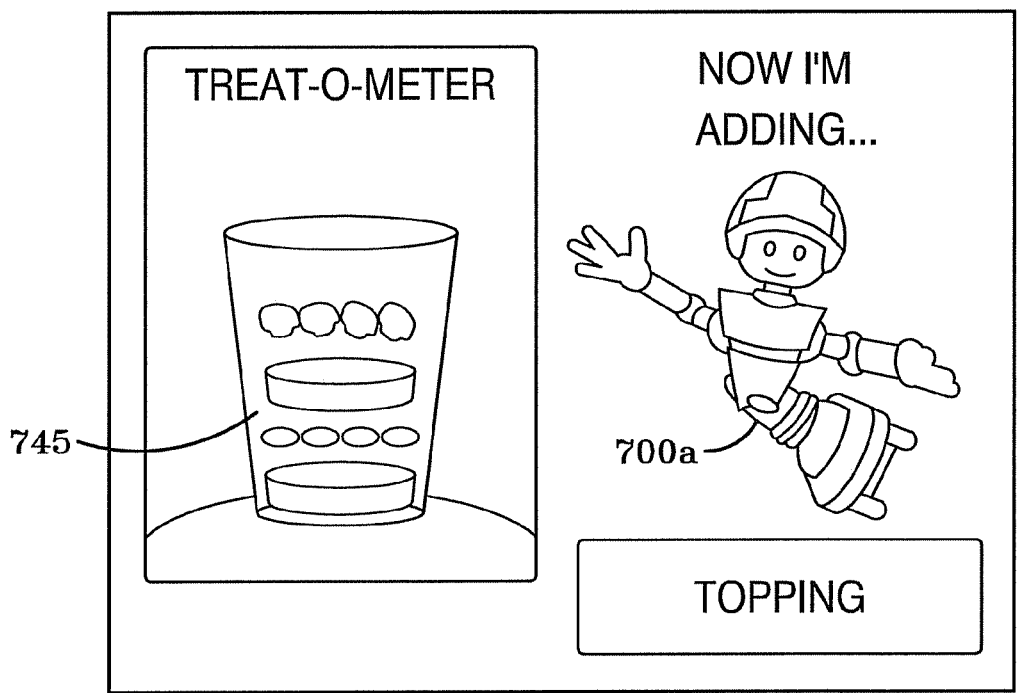
FIG. 21 is an exemplary fourth screen display showing an animation of the assembly of the frozen confectionary.

As illustrated in the flow chart shown in FIG. 17, the user is therefore able to physically watch the robotic arm 316 assemble the treat according to their specifications. This is represented by the block 733a on FIG. 17. The user is also able to simultaneously watch their virtual robotic character 700a "aid" in the assembly of the frozen confectionary treat on the supplied display, in real time. This is represented by the block 733b on FIG. 17 and is shown in FIG. 21 on a fourth screen display 727. The overall effect on the user is that their selected robotic character 700a is helping in the process. The physical assembly 733a by the robotic arm 316 is accompanied by flashing lights and sounds that are preprogrammed to be linked to the selected robotic character 700a. Similarly, the animated virtual assembly 733b of the treat on the display 376 includes a variety of moving and/or changing images that show the confection being assembled layer by layer in synchronization with the robotic arm 316.

During the initial stages of the physical assembly process, the robotic arm 316 first does a little "dance" to music, meaning that it is rotated back and forth with a portion of the arm being rotated up and down and around in time to music and sounds that are played by the machine 310. Lights are also made to flash in synchrony with the music and sounds. Preferably, the "dance" is preprogrammed to be specific to the robotic character 700a. Although not illustrated herein, once the "dance" is over, a signal is sent by the computer to a product receptacle dispensing station within the interior of machine 310 to open a door to a sanitary storage area (not shown). Robotic arm 316 is moved into position adjacent the door and the gripping end 316a of robotic arm 316 is positioned to receive a product receptacle. The computer sends a signal to the dispensing station to dispense a single product receptacle 108 (FIG. 7). Gripping end 316a grasps product receptacle 108 and moves the same away from the door to the dispensing station. The computer then sends a signal to the dispensing station to close the door thereto. This dispensing of a product receptacle 108 on demand keeps all of the product receptacles in the most sanitary environment possible.

Robotic arm 316 then moves product receptacle 108 from the first location of adjacent the dispensing station to a second location within the interior 320 of machine 310. The physical movement 733a of the robotic arm 316 is animated 733b on the display 376 and is accompanied by various actions and sounds made by robotic character 700a. To the user, it will appear that robotic character 700a is controlling robotic arm 16. Robotic arm 316 moves product receptacle 108 to the second location and under a dispensing tube 314 extending from a container or dispensing station that corresponds with the first ingredient selected by the user. This physical move is, once again, shown animated on display 376. A pre-specified quantity of the selected first ingredient is dispensed from container 318 into product receptacle 108 while robotic arm 316 retains the same under the opening to the tube 314. This physical action is, once again, visually shown on the display screen 376 accompanied by animated movements of robotic character 700a. Robotic arm 316 swings around and shows product receptacle 108 to the user through viewing window 322, an action that is shown in animation on display 376 as well. Robotic arm 316 then moves product receptacle 108 with the layer of the first ingredient in it to a third location positioned beneath the dispensing tube 314' that extends from the container 318' that holds the second preselected ingredient. A signal is sent by the computer, and a quantity of the second ingredient is layered onto the layer of the first ingredient. The user observes the second ingredient being dispensed physically by looking through window 322 and sees it dispensed virtually by viewing display 376.

The computer is programmed so that at some point during the dispensing of the preselected ingredients, the robotic arm 316 "makes a mistake". The mistake is a programmed "accidental" movement where robotic arm 316 is moved to a location under an incorrect dispensing tube. In other words, robotic arm 316 appears to be going to dispense an ingredient that was not selected by the user or appears to be about to dispense a selected ingredient but in the wrong order from that specified by the user. Robotic character 700a is programmed to appear to "catch" the mistake. The animation involved at this point is accompanied by appropriate noises and sounds. This interaction makes it appear that the robotic character 700a is controlling robotic arm 316 and is assisting in the construction of the treat. The animation on display 376 may include animation that makes it appear that some part of the equipment has broken so that the robotic character 700a cannot control the robotic arm 316 anymore. Robotic character 700a then fixes the broken equipment and is then able to once again control robotic arm 316 and guides it to the correct dispensing tube. This "mistake" is designed to bring a heightened sense of anxiety, anticipation and relief to the user. It will be understood that any suitable programming and animation that enhances the entertainment aspect of the dispensing of the ingredients can be utilized without departing from the scope of the invention.

Figure 22:
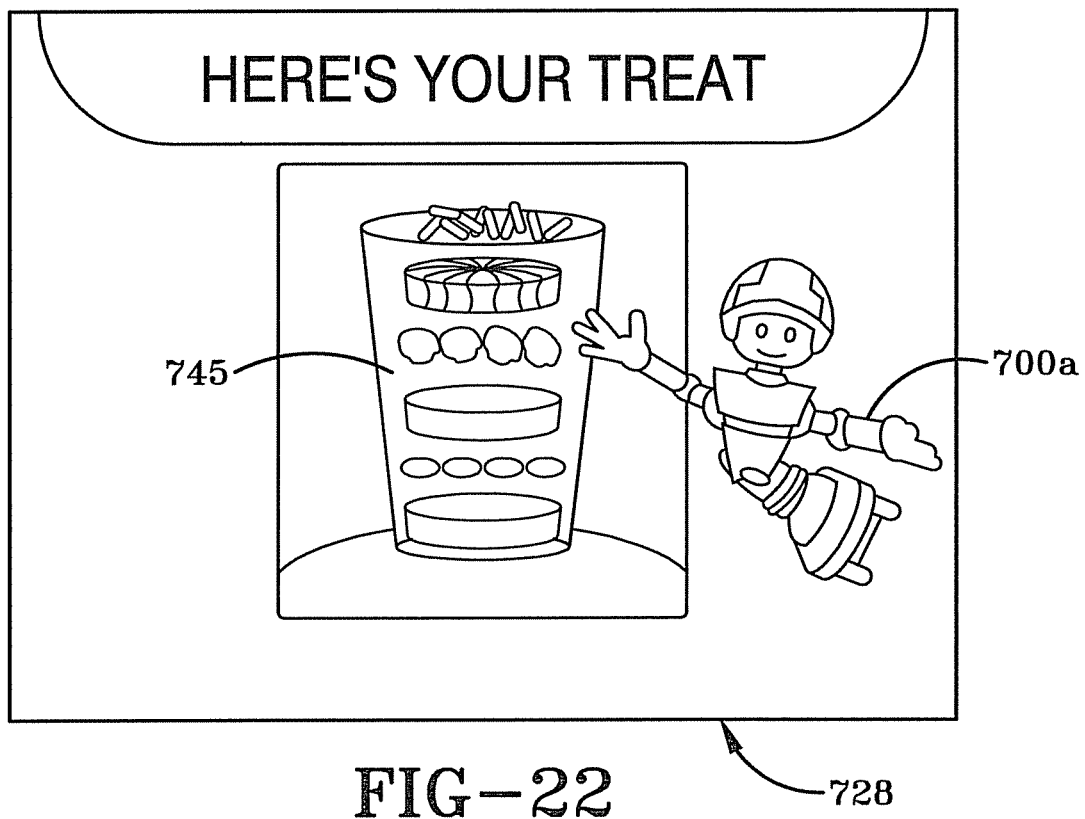
FIG. 22 is an exemplary fifth screen display showing an animation of the delivery of the assembled frozen confectionary.

The physical movements of robotic arm 316 continue until all six layers have been introduced into product receptacle 108 and frozen confectionary 800 is ready for delivery. The robotic arm 316 then moves the frozen confectionary from adjacent the delivery conductor of the last added ingredient to a product delivery port 321 (FIG. 7). The physical delivery is indicated on FIG. 17 by block 735a and the animated delivery is indicated by block 735b thereon. Display 376 and the lights and sounds generated by the computer also indicate to the user that the finished product is ready and will be moved to delivery port 321. Robotic arm 316 places the assembled frozen confectionary 800 on a first region of a turntable 357. This movement is also shown visually on display 376. Once frozen confectionary 800 is placed on turntable 357, arm 316 moves out of the way. A final screen display 728 (FIG. 22) is brought up on touch screen 324. The computer sends a signal to a motor (not shown) operationally engaged with turntable 357 and the motor rotates turntable 357 through 180 degrees. This brings frozen confectionary 800 into a position where it is accessible to the user. Although not illustrated herein, turntable 357 includes a slip-clutch that will stop the rotational motion if the user touches the turntable 357 before it has ceased rotating. After a lag time of 45 seconds in which the user can remove frozen confectionary 800, the computer sends a signal to the motor to rotate turntable 357 back to its original position. When turntable 357 is back in its original position, it is locked against rotation so that the user cannot move it. Once again, the movements of the arm 316 and the frozen confectionary 800 are displayed virtually on display 376 "hosted" by robotic character 700a. The entire assembly process takes anywhere from 5-40 seconds depending on the selections made by the user. Kiosk 400 is also provided with access ports (not shown) for dispensing napkins and spoons to the user.

Once frozen confectionary 800 has been retrieved from the machine 310 by the user, robotic arm 316 and robotic character 700a wave goodbye to the user accompanied by suitable lights, sounds and music and the machine 310 is deactivated. These actions are indicated on FIG. 17 by blocks 737am 737b and 729, respectively. Machine 310 is then ready for reactivation by the next user.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A vending machine for assembling and delivering a food or drink product to a user of the vending machine, said vending machine comprising:
   an assembly machine comprising:
      a housing having an interior and a transparent viewing window for viewing at least a portion of the interior by a user of the vending machine;
      a plurality of ingredient dispensing stations each of the plurality of ingredient dispensing stations being located at a different location within the interior of the housing;
      a robotic arm for assembling the food or drink product, said robotic arm being configured for movement between the plurality of ingredient dispensing stations; said robotic arm being adapted to move the food or drink product from one of the plurality of ingredient dispensing stations at one location in the vending machine to another of the plurality of ingredient dispensing stations at another location in the vending machine during assembly thereof;
      a user interface operationally linked to the robotic arm and the plurality of ingredient dispensing stations;
      a user output including a speaker and a display screen;
      a first circuit sequence operatively connected to the user interface and controlling the user output;
      a second circuit sequence operatively connected to the user interface and controlling the user output;
      the first circuit sequence controlling the user output in a way different from a second user sequence; in which a first and second user outputs are operatively associated with the robotic arm to assure that the first and second circuit sequences correspond to movements of the robotic arm; and
      programming provided in the user interface to selectively generate one of a plurality of animated robotic figure on the display screen; and to generate sounds linked to the animated robotic figures which are then emitted by the speaker; and wherein the plurality of animated robotic figures are operable on the first circuit sequence; said first circuit sequence being activated upon entry of a first user input into the user interface; and wherein the programming synchronizes physical assembly of the food or drink product by the robotic arm with an animated assembly of the food or drink product shown on the display.

2. The vending machine as defined in claim 1, wherein the programming further includes a plurality of animated tracks operable on the second circuit sequence, one of the plurality of animated tracks being automatically initiated upon entry of the first user input.

3. The vending machine as defined in claim 2, wherein the programmed animated tracks each comprise an animated robotic figure-specific animation sequence, a music selection, a sound selection, and a lighting pattern.

4. The vending machine as defined in claim 1, further including a third circuit sequence operatively connected to the user interface and controlling the user output; the third circuit sequence controlling the user output in a way different from each of the first the second circuit sequences; and in which a third user output is operatively associated with the robotic arm to assure that the third circuit sequence corresponds to movements of the robotic arm.

5. The vending machine as defined in claim 4, further including a plurality of ingredient selections operable on the third circuit sequence, said third circuit sequence being activated upon entry of a second user input into the user interface.

6. The vending machine as defined in claim 1 wherein the interior of the housing is defined by an exterior wall of the housing; and the user interface is mounted in the exterior wall; and wherein the vending machine, further comprises:

a kiosk including a perimeter wall, wherein at least part of the perimeter wall extends outwardly beyond a portion of the housing exterior wall upon which the user interface is mounted and defines a chamber within which the vending machine is housed; and at least one passageway is defined in the perimeter wall to provide access to the chamber and to the vending machine.

7. The vending machine as defined in claim 6, wherein the chamber within the kiosk is large enough for a customer to enter into the same through an entry into the passageway so as to gain access to the user interface to order their food or drink product.

8. The vending machine as defined in claim 7, wherein the display screen is disposed on one of the kiosk perimeter wall and a region of the assembly machine;

a central processing unit is operationally linked to the display screen; and the programming is provided in the central processing unit and generates the animated images on the display screen, which images are coordinated with the movements of the robotic arm in real time.

9. The vending machine as defined in claim 7, further comprising:

an opening defined in the exterior wall of the housing; said opening providing access to the interior of the housing; and a door mounted on the housing and being movable between an open and closed position; and when in a closed position, the door prevents access to the interior of the housing.

10. The vending machine as defined in claim 1, wherein the user output further comprises a light.

11. The vending machine as defined in claim 1, wherein the user output further comprises a scent generator.

* * * * *